US012770746B2

(12) United States Patent
Fujimoto et al.

(10) Patent No.: US 12,770,746 B2
(45) Date of Patent: Oct. 20, 2026

(54) FUEL ASSEMBLY

(71) Applicant: Hitachi, Ltd., Tokyo (JP)

(72) Inventors: Kiyoshi Fujimoto, Tokyo (JP); Takuji Nagayoshi, Tokyo (JP); Hajime Furuichi, Tokyo (JP); Takeshi Mitsuyasu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 18/139,519

(22) Filed: Apr. 26, 2023

(65) Prior Publication Data

US 2023/0386687 A1 Nov. 30, 2023

(30) Foreign Application Priority Data

May 30, 2022 (JP) ................................ 2022-087361

(51) Int. Cl.
*G21C 3/10* (2006.01)
*G21C 3/33* (2006.01)

(52) U.S. Cl.
CPC .................................... *G21C 3/10* (2013.01); *G21C 3/33* (2013.01)

(58) Field of Classification Search
CPC .......... G21C 3/10; G21C 3/33; G21C 3/3305; G21C 3/3315
See application file for complete search history.

(56) References Cited

U.S. PATENT DOCUMENTS 4,684,501 A * 8/1987 Lui ..................... G21C 3/3315
376/442

FOREIGN PATENT DOCUMENTS

| | | | | |
|---|---|---|---|---|
| JP | 1-232290 | A | | 9/1989 |
| JP | H01232290 | A | * | 9/1989 |
| JP | H11174176 | A | * | 7/1999 |

* cited by examiner

*Primary Examiner* — Sharon M Davis
(74) *Attorney, Agent, or Firm* — Crowell & Moring LLP

(57) ABSTRACT

A fuel assembly according to the present invention includes an end plug disposed on both upper and lower end portions of a fuel rod, and a tie plate that supports at least an upper portion of the end plug. The end plug includes a plurality of support protrusions on a surface of the end plug, and a closed-loop spring having a portion that is inserted through an opening portion formed in the end plug and is stored in a single space formed in the end plug, and a remaining portion protruding to the outside of the end plug. The end plug is supported by the plurality of support protrusions and the closed-loop spring in a state in which the plurality of support protrusions and the closed-loop spring are in contact with an inner wall of an insertion hole formed in the tie plate.

8 Claims, 24 Drawing Sheets

FUEL ASSEMBLY

CLAIM OF PRIORITY

The present application claims priority from Japanese Patent application serial no. 2022-087361, filed on May 30, 2022, the content of which is hereby incorporated by reference into this application.

BACKGROUND OF THE INVENTION

The present invention relates to a fuel assembly, and particularly to a fuel assembly suitable to be constituted by a plurality of fuel rods densely disposed in a reactor core in a reactor pressure vessel, and a tie plate that supports and fixes the plurality of fuel rods.

As a conventional technique in this kind of technical field, for example, there is an "upper tie plate of a fuel assembly" described in Japanese Patent Unexamined Publication No. H1-232290.

Japanese Patent Unexamined Publication No. H1-232290 describes the upper tie plate of the fuel assembly in which, to maintain binding force between the upper tie plate and a fuel component at an approximately constant level even when there is a difference in elongation between fuel components and to provide the upper tie plate having a structure capable of easily absorbing a vibration caused by vertical elongation of the fuel components and a water flow, an insertion hole in which an upper end plug of the fuel component can be inserted is formed, the fuel component with the upper end plug inserted in the insertion hole is held at an upper portion thereof, and a plurality of leaf springs are disposed on the inner surface of the insertion hole at symmetrical positions with respect to the center of the hole so as to be able to apply pressure force to the upper end plug in a state in which the upper end plug of the fuel component is in contact with protruding surfaces of the leaf springs.

In recent years, a boiling water reactor (hereinafter referred to as a reduced-moderation spectrum boiling water reactor) has been developed, in which a plurality of fuel assemblies are loaded in a reactor core, a control rod having a cross-shaped cross section is inserted between the fuel assemblies, a plurality of fuel rods are densely disposed in each of channel boxes of the fuel assemblies, voids are generated in the channel boxes during the operation to cure a neutron spectrum and improve a nuclear fission plutonium conversion ratio.

Similarly to a conventional boiling water reactor, in the reduced-moderation spectrum boiling water reactor, an upper end plug and a lower end plug are disposed at an upper portion and a lower portion of each fuel rod, respectively, and the upper end plug is inserted in an insertion hole of an upper tie plate and the lower end plug is inserted in an insertion hole of a lower tie plate to support an upper end portion and a lower end portion of the fuel rod.

In the reduced-moderation spectrum boiling water reactor being developed, the diameter of each fuel rod is made smaller than that of a conventional BWR fuel (for example, arrangement of 9×9 fuel rods) to densely dispose a large number of fuel rods. Therefore, it is necessary to take measures to prevent the fuel rods from being damaged due to a hydrodynamic vibration. The latest boiling water reactor (for example, arrangement of 11×11 fuel rods) is already designed such that fuel spacers are provided at upper and lower ends of fuel rods to prevent the fuel rods from vibrating.

The above-described Japanese Patent Unexamined Publication No. H1-232290 describes that, in a state in which the upper end plug of the fuel rod is inserted in the insertion hole of the upper tie plate, the leaf springs are disposed on the inner wall of the insertion hole of the upper end plug of the upper tie plate at angular intervals of 90 degrees in four directions and can suppress a vibration of the upper end plug of the fuel rod.

However, in Japanese Patent Unexamined Publication No. H1-232290, although the four leaf springs are welded to and disposed on the inner wall surface of the insertion hole of the upper tie plate, it is predicted that the material of the leaf springs is different from the material of the upper tie plate (for example, the leaf springs is made of Inconel, and the upper tie plate is made of stainless). Therefore, it is considered that the leaf springs may become loose parts due to damage to welded parts made of the different metals.

SUMMARY OF THE INVENTION

The present invention was made in view of the above-described problems, and an object of the present invention is to provide a fuel assembly that has a structure in which a spring hardly becomes a loose part, and can suppress a vibration of a fuel rod and an increase in pressure loss of the fuel assembly.

According to the present invention, to achieve the above-described object, a fuel assembly includes an end plug disposed on both upper and lower end portions of a fuel rod, and a tie plate that supports at least an upper portion of the end plug. The end plug includes a plurality of support protrusions on a surface of the end plug, and a closed-loop spring having a portion that is inserted through an opening portion formed in the end plug and is stored in a single space formed in the end plug, and a remaining portion protruding to the outside of the end plug, and the end plug is supported by the plurality of support protrusions and the closed-loop spring in a state in which the plurality of support protrusions and the closed-loop spring are in contact with an inner wall of an insertion hole formed in the tie plate.

In addition, to achieve the above-described object, a fuel assembly includes an end plug disposed on both upper and lower end portions of a fuel rod, and a tie plate that supports at least an upper portion of the end plug. The fuel assembly includes a cylindrical plate disposed around the end plug and having a cylindrical or polygonal cross section. The cylindrical plate is disposed on and fixed to the end plug by inserting the end plug in the cylindrical plate and bring the cylindrical plate into contact with the end plug, the cylindrical plate includes a protruding spring and a plurality of support protrusions on the outer side of the cylindrical plate such that the protruding spring and the plurality of support protrusions face an inner wall surface of the tie plate, and the protruding spring, the plurality of support protrusions, and an inner wall of an insertion hole formed in the tie plate constitute a support structure for supporting the end plug in a lateral direction.

In addition, to achieve the above-described object, according to the present invention, a fuel assembly includes an end plug disposed on both upper and lower end portions of a fuel rod, and a tie plate that supports at least an upper portion of the end plug. The fuel assembly includes a cylindrical plate disposed around the end plug and having a cylindrical or polygonal cross section. The cylindrical plate is disposed on and fixed to the end plug by inserting the end plug in the cylindrical plate and bring the cylindrical plate into contact with the end plug. The cylindrical plate includes a protruding spring and a plurality of support protrusions on the inner side of the cylindrical plate such that the protruding spring and the plurality of support protrusions face an outer surface of the end plug. The protruding spring, the plurality of support protrusions, and the end plug constitute a support structure for supporting the end plug in a lateral direction.

According to the present invention, in a structure in which a spring hardly becomes a loose part, it is possible to suppress an increase in a vibration of a fuel rod and an increase in pressure loss of a fuel assembly.

DETAILED DESCRIPTION OF THE PREFERRED EMBODIMENTS

Hereinafter, a fuel assembly according to the present invention is described based on embodiments illustrated. In the embodiments described below, the same reference signs are used for the same constituent components.

First, a boiling water reactor 100 in which the fuel assembly according to the present invention is used is described with reference to FIG. 1. The boiling water reactor 100 in which the fuel assembly according to the present invention illustrated in FIG. 1 is used is a reduced-moderation spectrum boiling water reactor.

Figure 1:
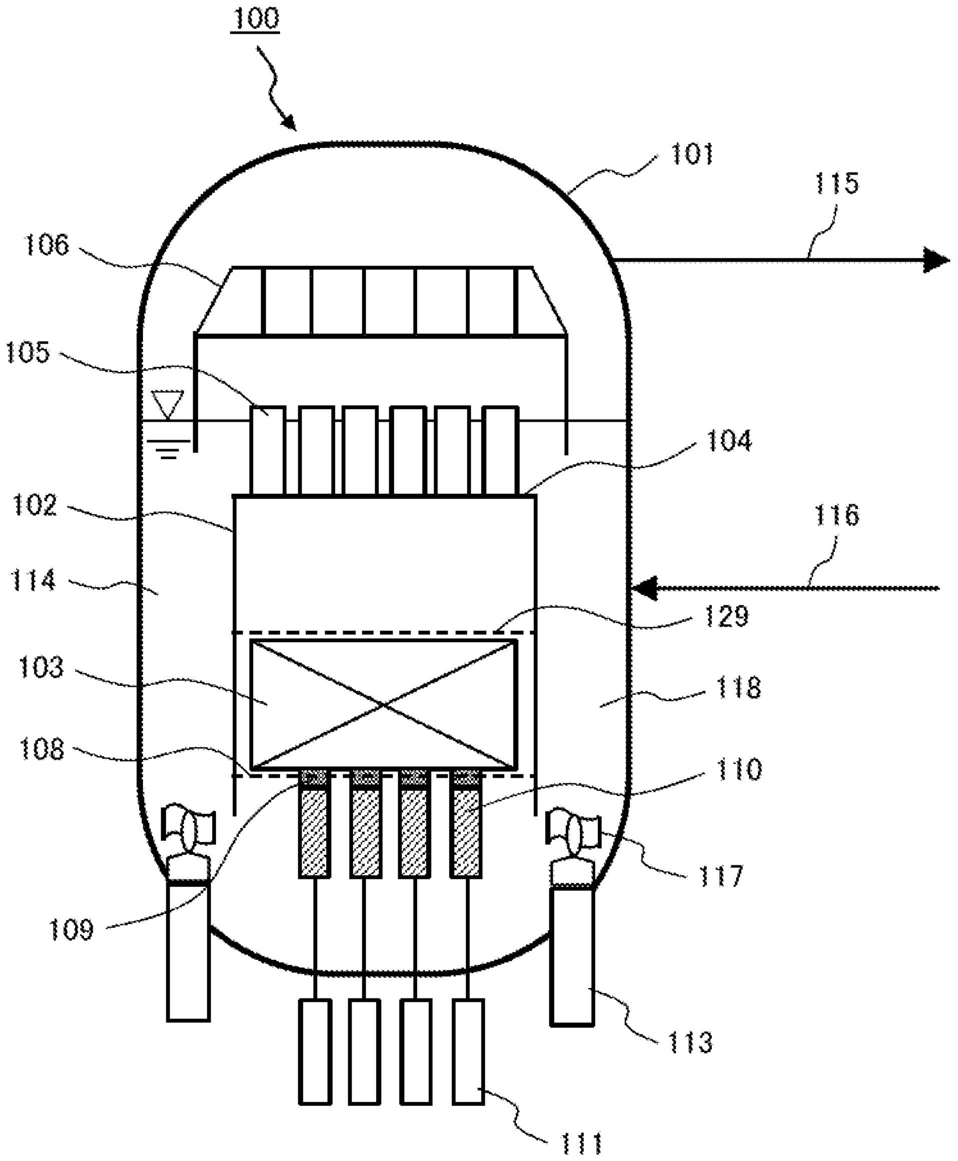
FIG. 1 is a vertical cross sectional view illustrating an entire schematic configuration of a boiling water reactor in which a fuel assembly according to the present invention is used.

As illustrated in FIG. 1, the boiling water reactor 100 is substantially constituted by a cylindrical reactor core shroud 102 disposed in a reactor pressure vessel 101, a reactor core 103 that is disposed in the reactor core shroud 102 and in which a plurality of fuel assemblies 120 are arranged in a square lattice, a shroud head 104 disposed in the reactor pressure vessel 101 and covering the reactor core 103, a steam separator 105 disposed on the shroud head 104 and extending upward, a steam dryer 106 disposed above the steam separator 105, an upper grid plate 129 disposed in the reactor core shroud 102 and at an upper end portion of the reactor core 103, a reactor core support plate 108 disposed in the reactor core shroud 102 and at a lower end portion of the reactor core 103, a fuel support metal fixture 109 disposed on the reactor core support plate 108, a control rod guiding pipe 110 disposed in the reactor pressure vessel 101 and enabling a control rod (cross-shaped control rod 132 illustrated in FIG. 2) having a cross-shaped lateral cross section to be inserted in the reactor core 103 to control a nuclear reaction in the fuel assemblies 120, a control rod drive mechanism 111 that is disposed in a control rod drive mechanism housing (not illustrated) disposed below a bottom portion of the reactor pressure vessel 101 and is coupled to the cross-shaped control rod 132, and an internal pump 113 having an impeller 117 and disposed at the bottom portion of the reactor pressure vessel 101 so as to be inserted through the inside of the reactor pressure vessel 101 from below the reactor pressure vessel 101.

In addition, the internal pump 113 is disposed to extend toward an annular downcomer 114 formed between an outer surface of the cylindrical reactor core shroud 102 and an inner surface of the reactor pressure vessel 101.

In addition, cooling water (sub-cooling water: cooling water at a lower temperature than that in a saturated state) 118 in the reactor pressure vessel 101 flows into the reactor core 103 from the bottom portion side of the reactor pressure vessel 101 by the internal pump 113. The cooling water 118 that has flowed into the reactor core 103 is heated by a nuclear reaction in the fuel assemblies 120 (see FIG. 2) to become a gas-liquid two-phase flow and flows into the steam separator 105.

The gas-liquid two-phase flow that has flowed into the steam separator 105 is separated into a steam containing moisture (gas phase) and water (liquid phase). The water (liquid phase) flows downward as the cooling water 118 to the downcomer 114 and the steam (gas phase) flows to the steam dryer 106 so that the moisture is removed, and is supplied to a turbine (not illustrated) through a main steam pipe 115. The steam supplied to the turbine is returned to water by a condenser (not illustrated) and flows into the reactor pressure vessel 101 via a water supply pipe 116.

In addition, although described later, the reactor core 103 includes the plurality of fuel assemblies 120 (four fuel assemblies) arranged in the square lattice, and the cross-shaped control rod 132 between the fuel assemblies 120 to control a nuclear reaction in the fuel assemblies 120.

Next, the fuel assemblies 120 are described with reference to FIG. 2.

Figure 2:
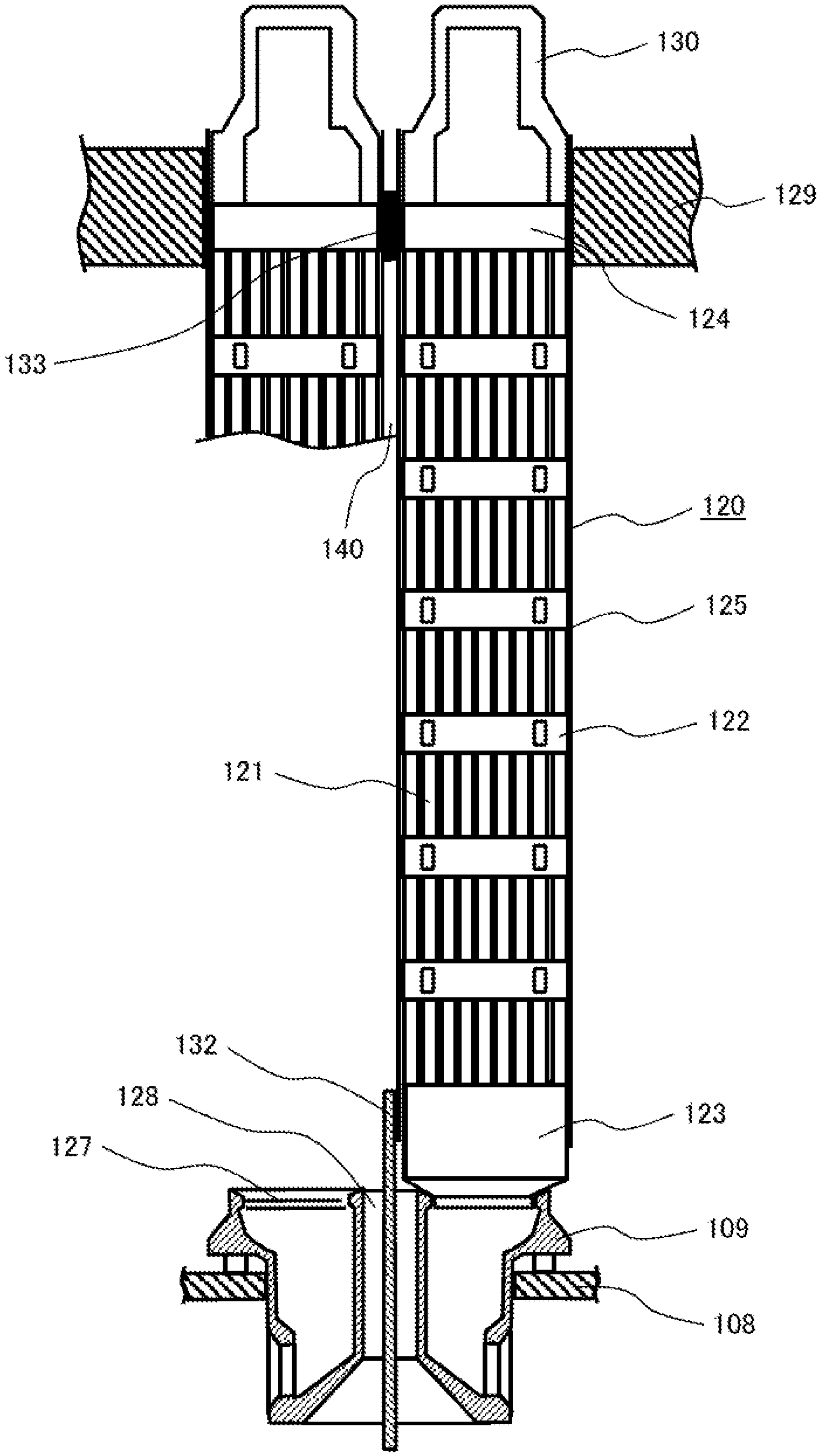
FIG. 2 is a partial cross sectional view illustrating a conventional fuel assembly used in a boiling water reactor.

The plurality of fuel assemblies 120 illustrated in FIG. 2 are disposed in the reactor core 103 as described above and arranged in the square lattice.

As illustrated in FIG. 2, each of the fuel assemblies 120 is substantially constituted by a rectangular cylindrical channel box 125, fuel rods 121 densely arranged in a square in the channel box 125, a plurality of spacers 122 arranged in a vertical direction (height direction of the fuel assemblies 120: vertical direction) and supporting (supporting the fuel rods 121 at arbitrary intervals such that the fuel rods 121 are not in contact with each other in the height direction of the fuel assemblies 120) the fuel rods 121 at fixed intervals in a lateral direction (horizontal direction), an upper tie plate 124 fixing upper portions of the fuel rods 121, a lower tie plate 123 fixing lower portions of the fuel rods 121, and a handle 130 disposed on the upper tie plate 124.

The upper portion of each of the fuel assemblies 120 illustrated in FIG. 2 is supported by the upper grid plate 129, while the lower portion of each of the fuel assemblies 120 illustrated in FIG. 2 is supported by the fuel support metal fixture 109.

In addition, a space 140 for movement of the cross-shaped control rod 132 is formed between the adjacent fuel assemblies 120 so that the cross-shaped control rod 132 moves in the vertical direction. The space 140 for movement of the cross-shaped control rod 132 is formed by a channel spacer 133 disposed in the channel box 125.

In addition, upper opening portions 127 into which the lower portion of the lower tie plate 123 is fitted are formed in the fuel support metal fixture 109. A control rod movement opening portion 128 for the vertical movement of the cross-shaped control rod 132 is formed between the adjacent upper opening portions 127.

Figure 3:
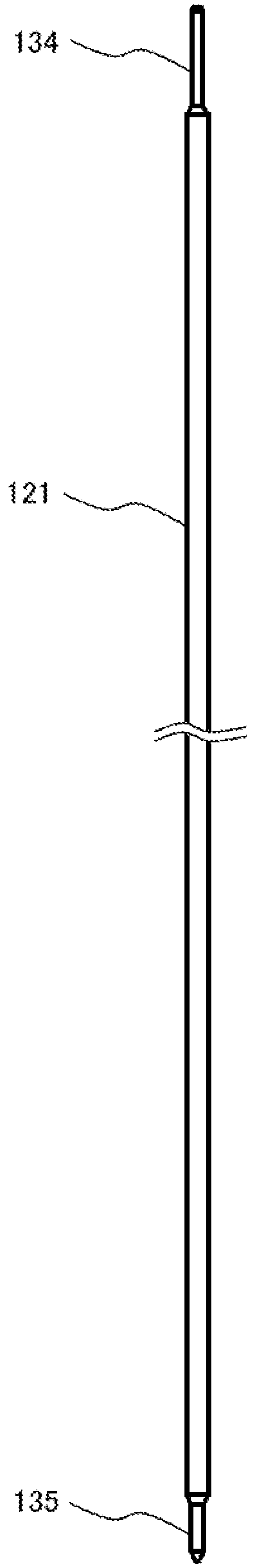
FIG. 3 is a diagram illustrating an entire fuel rod embedded in a conventional fuel assembly used in a boiling water reactor.

FIG. 3 illustrates the fuel rod 121 used in the fuel assembly 120 illustrated in FIG. 2.

As illustrated in FIG. 3, an upper end plug 134 and a lower end plug 135 are disposed at the upper end portion and the lower end portion of each of the fuel rod 121, respectively.

Figure 4:
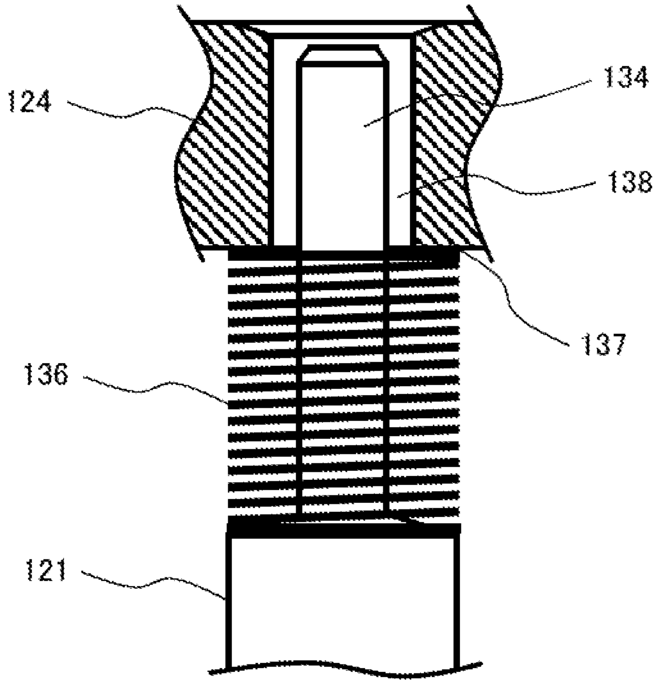
FIG. 4 is a partial cross sectional view illustrating an upper end plug supported in a state in which the fuel rod is embedded in the conventional fuel assembly used in the boiling water reactor.
Figure 5:
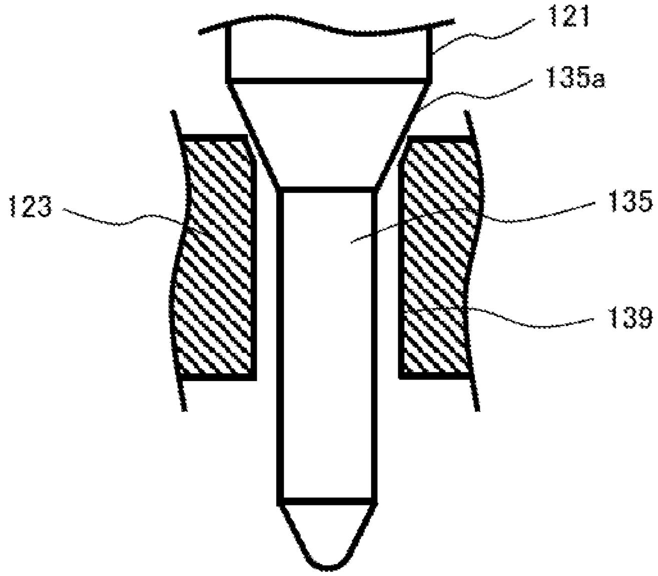
FIG. 5 is a partial cross sectional view illustrating a lower end plug supported in the state in which the fuel rod is embedded in the conventional fuel assembly used in the boiling water reactor.

FIG. 4 illustrates a conventional support portion for the upper end plug 134 of the fuel rod 121 in the fuel assembly 120, while FIG. 5 illustrates a conventional support portion for the lower end plug 135 of the fuel rod 121 in the fuel assembly 120.

FIGS. 4 and 5 illustrate the fuel rod 121 other than some fuel rods (not illustrated) coupling the upper tie plate 124 to the lower tie plate 123.

The upper portion of the fuel rod 121 is supported by inserting the upper end plug 134 of the fuel rod 121 into an insertion hole 138 formed in the upper tie plate 124, as illustrated in FIG. 4. In addition, an expansion spring 136 is disposed between the fuel rod 121 and the upper tie plate 124 such that the body of the fuel rod 121 does not contact the upper tie plate 124 by thermal expansion. The expansion and contraction of the expansion spring 136 absorbs the thermal expansion of the body of the fuel rod 121. A force applied to the expansion spring 136 is received by a lower surface 137 of the upper tie plate 124.

On the other hand, the lower portion of the fuel rod 121 is supported by inserting the lower end plug 135 of the fuel rod 121 into an insertion hole 139 formed in the lower tie plate 123, and the load of the fuel rod 121 is received by a tapered portion 135*a* formed above the lower end plug 135.

First Embodiment

Next, a first embodiment of a fuel assembly 120 according to the present invention is described.

Constituent components that are features in the first embodiment of the fuel assembly 120 according to the present invention are a leaf spring 1 and a plurality of support protrusions 2*a*, 2*b*, 3*a*, and 3*b* disposed at an upper end plug 134 of a fuel rod 121 illustrated in FIGS. 6, 7A, 7B, 7C, 8, and 9. These components are described below in detail.

Figure 6:
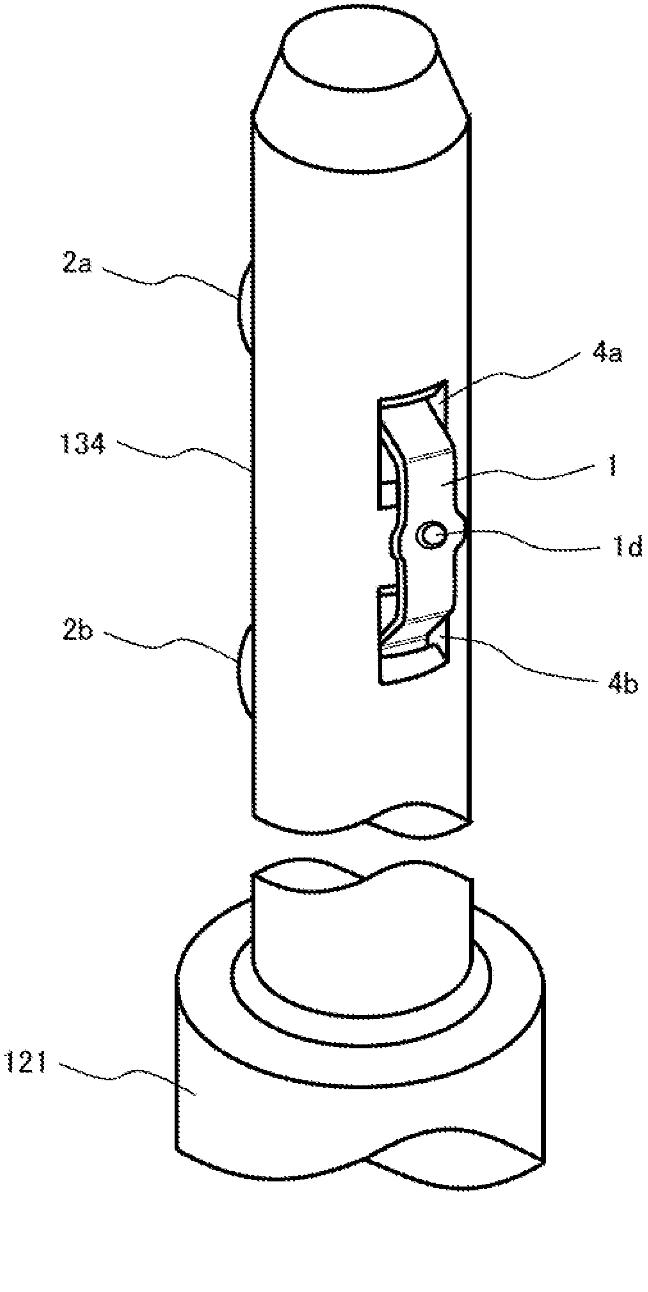
FIG. 6 is a perspective view illustrating a support structure portion provided for supporting in a lateral direction at an upper end plug of a fuel rod according to a first embodiment of the fuel assembly according to the present invention in the boiling water reactor.
Figure 7A:
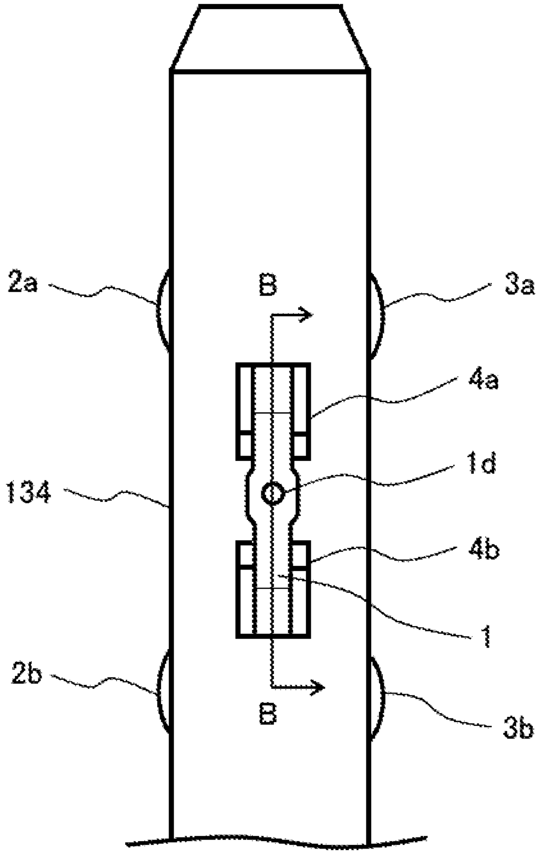
FIG. 7A is a front view illustrating the support structure portion provided for supporting in the lateral direction at the upper end plug of the fuel rod according to the first embodiment of the fuel assembly according to the present invention in the boiling water reactor.
Figure 7B:
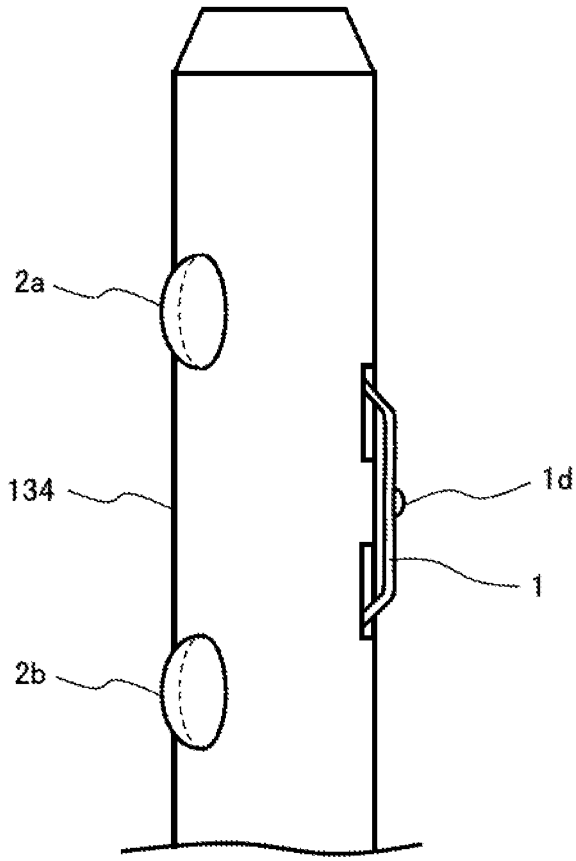
FIG. 7B is a side view of the support structure portion illustrated in FIG. 7A.
Figure 7C:
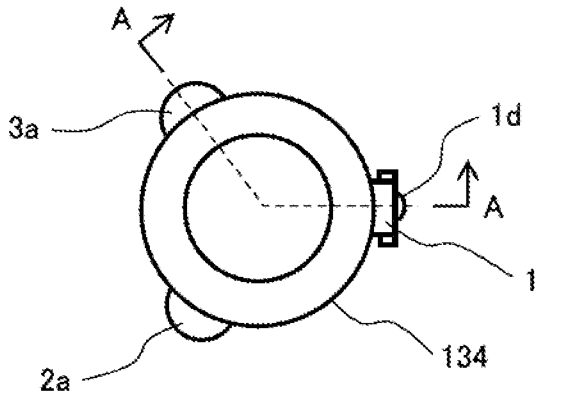
FIG. 7C is a plan view of the support structure portion illustrated in FIG. 7B.
Figure 8:
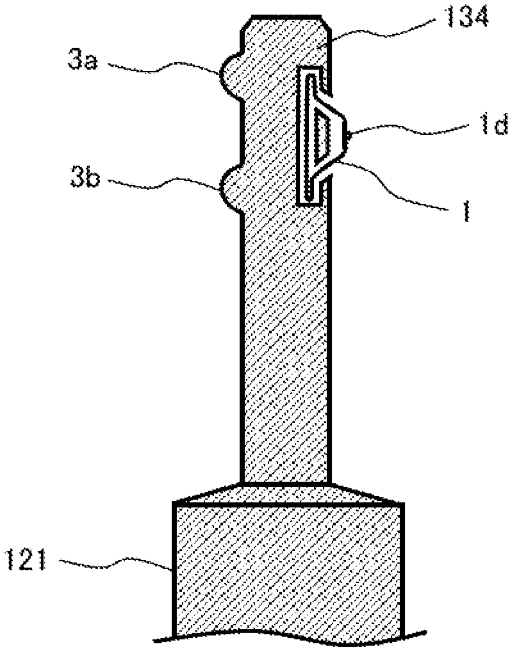
FIG. 8 is a cross sectional view taken along line A-A illustrated in FIG. 7C.
Figure 9:
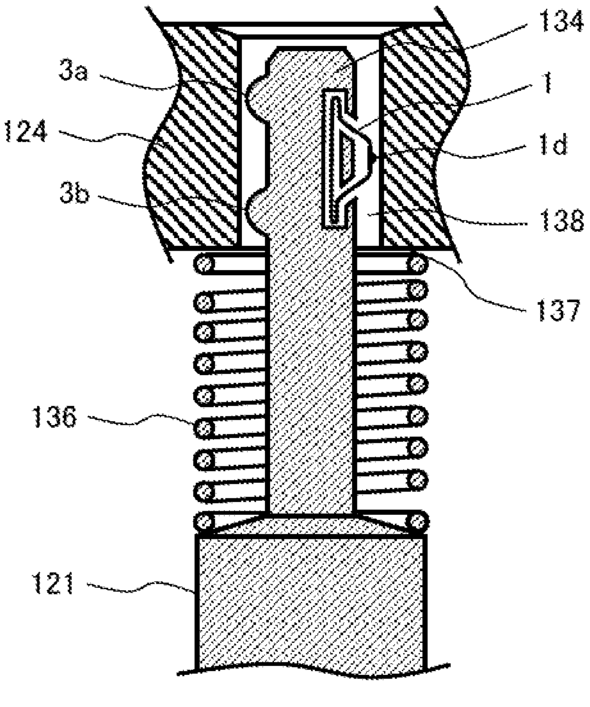
FIG. 9 is a partial detailed cross sectional view illustrating a state in which the upper end plug provided with the support structure portion for supporting in the lateral direction and disposed on the fuel rod according to the first embodiment of the fuel assembly according to the present invention in the boiling water reactor is embedded in the fuel assembly.

FIG. 6 is a perspective view of a support structure portion for supporting in the lateral direction at the upper end plug 134 of the fuel rod 121. FIG. 7A is a front view of the support structure portion for supporting in the lateral direction at the upper end plug 134 of the fuel rod 121. FIG. 7B is a side view of the support structure portion illustrated in FIG. 7A. FIG. 7C is a plan view of the support structure portion illustrated in FIG. 7B. FIG. 8 is a cross sectional view taken along line A-A illustrated in FIG. 7C. FIG. 9 is a partial detailed cross sectional view illustrating a state in which the upper end plug 134 provided with the support structure portion for supporting in the lateral direction and disposed on the fuel rod 121 is embedded in the fuel assembly 120.

As illustrated in FIGS. 6, 7A, 7B, and 7C, the leaf spring 1 and the plurality of support protrusions 2*a*, 2*b*, 3*a*, and 3*b* are disposed at the upper end plug 134 of the fuel rod 121.

That is, as illustrated in FIG. 7C, the support protrusions 2*a* and 3*a* are disposed at an angular interval of 120 degrees in two directions on the surface of the upper end plug 134, and the leaf spring 1 arranged in one direction on the surface of the upper end plug 134. As illustrated in FIG. 7A, the support protrusions 2*a* and 2*b* and the support protrusions 3*a* and 3*b* are disposed at two positions in the vertical direction, and the height positions of the support protrusions 2*a* and 2*b* and the support protrusions 3*a* and 3*b* are the same as or close to the height positions of the upper and lower opening portions 4*a* and 4*b* formed in the upper end plug 134 such that the leaf spring 1 is inserted in the upper and lower opening portions 4*a* and 4*b* (the support protrusions 2*a* and 2*b* and the support protrusions 3*a* and 3*b* are arranged such that the interval between the support protrusions 2*a* and 2*b* and the interval between the support protrusions 3*a* and 3*b* are the same with respect to the center of a protruding portion 1*d* of the leaf spring 1).

FIG. 8 is a vertical cross sectional view (cross sectional view taken along line A-A illustrated in FIG. 7C) of a portion in which the support protrusions 3*a* and 3*b* and the leaf spring 1 are disposed at the upper end plug 134. FIG. 9 is a partial detailed cross sectional view illustrating a state in which the upper end plug 134 illustrated in FIG. 8 is inserted in the insertion hole 138 formed in the upper tie plate 124.

As illustrated in FIG. 9, the support protrusions 3*a* and 3*b* have a semicircular shape and the leaf spring 1 has a partially protruding shape, that is, has the protruding portion 1*d* having a protruding shape partially protruding at one location such that, when the upper end plug 134 is inserted in the insertion hole 138 formed in the upper tie plate 124, portions of the upper tie plate 124 are in point contact or nearly in point contact with the leaf spring 1 and the support protrusions 3*a* and 3*b* (for example, the protruding portion 1*d* is formed by applying partial deep drawing by punching).

The shapes of the support protrusions 2*a* and 2*b* are the same as or similar to the shapes of the support protrusions 3*a* and 3*b*. As illustrated in FIG. 9, the support protrusions 3*a* and 3*b* and the leaf spring 1 disposed at the upper end plug 134 are in point contact with the inner wall surface of the insertion hole 138 formed in the upper tie plate 124 (although not illustrated, the support protrusions 2*a* and 2*b* are disposed in a similar manner to the support protrusions 3*a* and 3*b*).

In such a configuration, even when cooling water flows during the operation of a reactor, a vibration of the upper end plug 134 of the fuel rod 121 in the lateral direction can be suppressed since the upper end plug 134 is supported by the leaf spring 1, the support protrusions 2*a* and 2*b*, and the support protrusions 3*a* and 3*b*. In addition, a spacer as a countermeasure against the vibration of the fuel rod 121 is not required and the effect of suppressing an increase in pressure loss can be expected.

As illustrated in FIG. 9, since the fuel rod 121 is supported by the expansion spring 136, there is no problem with the movement of the fuel rod 121 in the vertical direction.

Next, FIGS. 10A, 10B, 10C, 11, and 12 illustrate a leaf spring 11 and a plurality of support protrusions 12*a*, 12*b*, 13*a*, and 13*b* disposed at a lower end plug of the fuel rod 121.

Figure 10A:
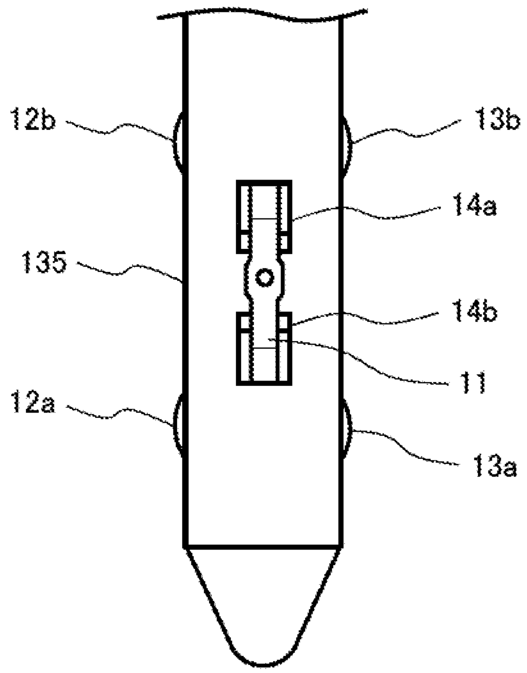
FIG. 10A is a front view illustrating a support structure portion provided for supporting in the lateral direction at a lower end plug of the fuel rod according to the first embodiment of the fuel assembly according to the present invention in the boiling water reactor.
Figure 10B:
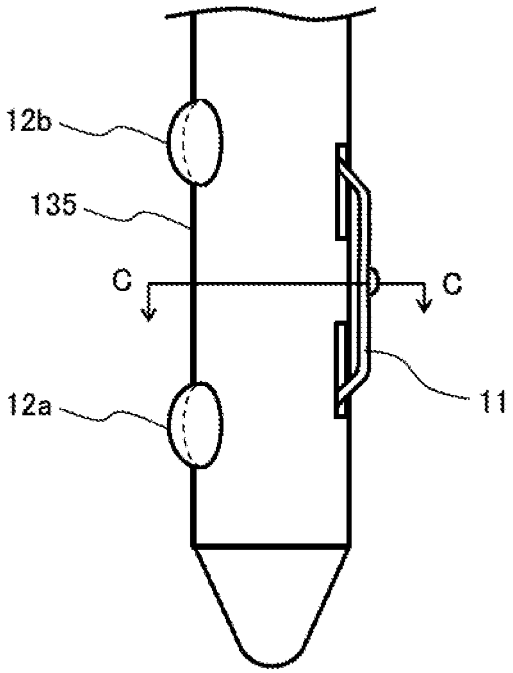
FIG. 10B is a side view of the support structure portion illustrated in FIG. 10A.
Figure 10C:
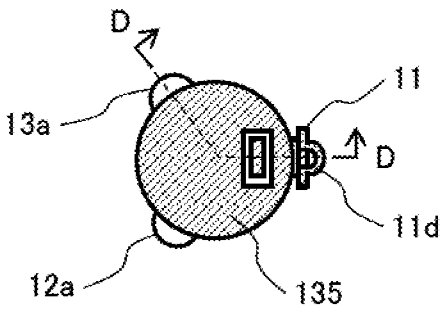
FIG. 10C is a plan view of the support structure portion illustrated in FIG. 10B.

As illustrated in FIG. 10C, on the surface of the lower end plug 135 of the fuel rod 121, the support protrusions 12*a* and 13*a* are arranged in two directions at an angular interval of 120 degrees and the leaf spring 11 arranged in one direction, similarly to the configuration illustrated in FIG. 7. As illustrated in FIG. 10A, the support protrusions 12*a* and 12*b* and the support protrusions 13*a* and 13*b* are disposed at two locations in the vertical direction, and the height positions of the support protrusions 12*a* and 12*b* and the support protrusions 13*a* and 13*b* are the same as or close to the height positions of upper and lower opening portions 14*a* and 14*b* that are formed in the lower end plug 135 and in which the leaf spring 11 is inserted (the support protrusions 12*a* and 12*b* and the support protrusions 13*a* and 13*b* are arranged such that the interval between the support protrusions 12*a* and 12*b* and the interval between the support protrusions 13*a* and 13*b* are the same with respect to the center of a protruding portion 11*d* of the leaf spring 11).

Figure 11:
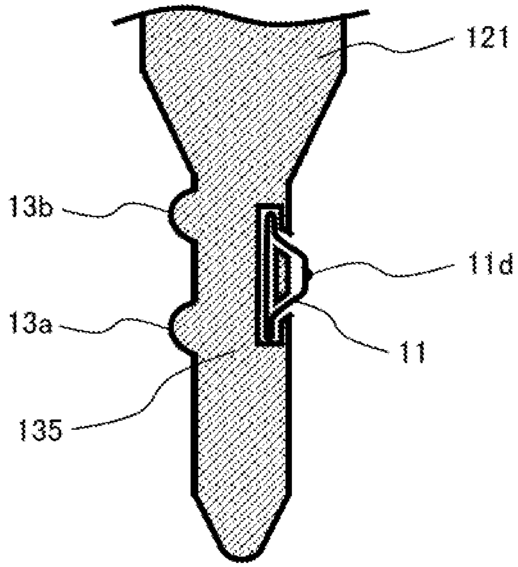
FIG. 11 is a cross sectional view taken along line D-D illustrated in FIG. 10C.
Figure 12:
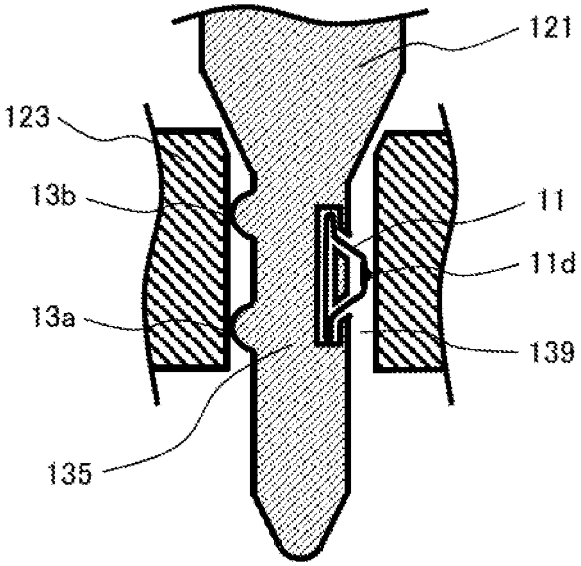
FIG. 12 is a partial detailed cross sectional view illustrating a state in which the lower end plug provided with the support structure portion for supporting in the lateral direction and disposed on the fuel rod according to the first embodiment of the fuel assembly according to the present invention in the boiling water reactor is embedded in the fuel assembly.

FIG. 11 is a partial vertical cross sectional view (cross sectional view taken along line D-D illustrated in FIG. 10C) of a portion where the support protrusions 13*a* and 13*b* and the leaf spring 11 of the lower end plug 135 illustrated in FIG. 10B are disposed. FIG. 12 is a partial detailed cross sectional view illustrating a state in which the lower end plug 135 illustrated in FIG. 11 is inserted in an insertion hole 139 formed in a lower tie plate 123.

As illustrated in FIG. 12, the support protrusions 13*a* and 13*b* have a semicircular shape and the leaf spring 11 includes the protruding portion 11*d* having a protruding shape partially protruding at one location such that, when the lower end plug 135 is inserted in the insertion hole 139 formed in the lower tie plate 123, portions of the lower tie plate 123 are in point contact or nearly in point contact with the leaf spring 11 and the support protrusions 13*a* and 13*b* (for example, the protruding portion 11*d* is formed by applying partial deep drawing by punching).

The shapes of the support protrusions 12*a* and 12*b* are the same as or similar to the shapes of the support protrusions 13*a* and 13*b*. As illustrated in FIG. 12, the support protrusions 13*a* and 13*b* and the leaf spring 11 disposed at the lower end plug 135 are in point contact with the inner wall surface of the insertion hole 139 formed in the lower tie plate 123 (although not illustrated, the support protrusions 12*a* and 12*b* are disposed in a similar manner to the support protrusions 13*a* and 13*b*).

In such a configuration, even when cooling water flows during the operation of the reactor, a vibration of the lower end plug 135 in the lateral direction can be suppressed since the lower end plug 135 is supported by the support protrusions 13*a* and 13*b* and the leaf spring 11, similarly to the configuration illustrated in FIG. 9.

Next, a procedure for attaching the leaf spring 1 used in the fuel assembly 120 according to the present embodiment to the upper end plug 134 is described with reference to FIGS. 13, 14, 15, 16, 17, and 18.

Figure 13:
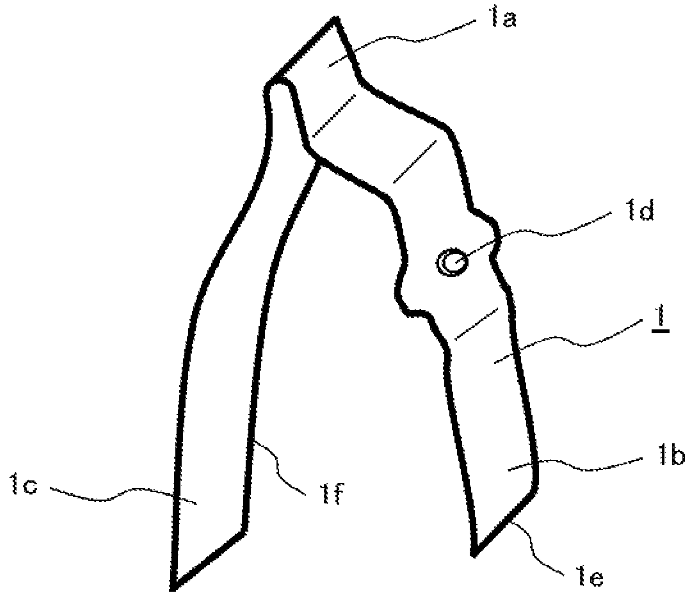
FIG. 13 is a perspective view illustrating a leaf spring constituting a part of the support structure portion provided for supporting in the lateral direction and used for the upper or lower end plug of the fuel rod according to the first embodiment of the fuel assembly according to the present invention in the boiling water reactor.

FIG. 13 illustrates the leaf spring 1 before the leaf spring 1 is attached to the upper end plug 134 of the fuel rod 121.

As illustrated in FIG. 13, the leaf spring 1 has a rectangular shape in which an end portion of the leaf spring 1 forms a short side 1*e*, a long side if of the leaf spring 1 extends upward from the short side 1*e*, and the short side 1*e* has a length shorter than an outer diameter of the upper end plug 134.

In addition, as illustrated in FIG. 13, before the leaf spring 1 is attached to the upper end plug 134 of the fuel rod 121, the leaf spring 1 is processed to be folded in half. After the leaf spring 1 processed to be folded in half is attached to the upper end plug 134, the protruding portion 1*d* is formed at a central portion (at an intermediate portion between a leaf spring intermediate portion 1*a* of the leaf spring 1 and a leaf spring end portion 1*b* of the leaf spring 1) of the leaf spring 1 arranged on the outer side of the upper end plug 134 so that the leaf spring 1 is in contact with the inner wall surface of the insertion hole 138 formed in the upper tie plate 124.

Figure 14:
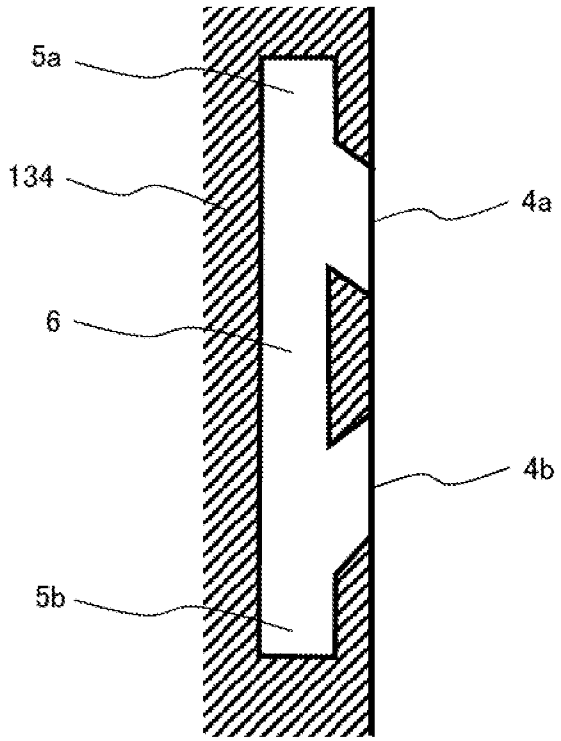
FIG. 14 is a cross sectional view taken along ling B-B illustrated in FIG. 7B, illustrating an opening portion required to attach the leaf spring used for the upper end plug of the fuel rod according to the first embodiment of the fuel assembly according to the present invention in the boiling water reactor.

In addition, FIG. 14 is a partial cross sectional view (cross sectional view taken along line B-B illustrated in FIG. 7A) of a portion where the leaf spring 1 processed to be folded in half is attached to the upper end plug 134.

As illustrated in FIG. 14, the two upper and lower opening portions 4*a* and 4*b* are disposed in the surface of the upper end plug 134 of the fuel rod 121. The upper opening portion 4*a* and the lower opening portion 4*b* communicate with each other through an opening communication portion 6 that is a single space in the upper end plug 134. A leaf spring intermediate portion storage section 5*a* in which the leaf spring intermediate portion 1*a* of the leaf spring 1 can be stored is formed above the opening communication portion 6. A leaf spring end portion storage section 5*b* in which the plate end portions 1*b* and 1*c* of the leaf spring 1 can be stored is formed below the opening communication portion 6.

Figure 15:
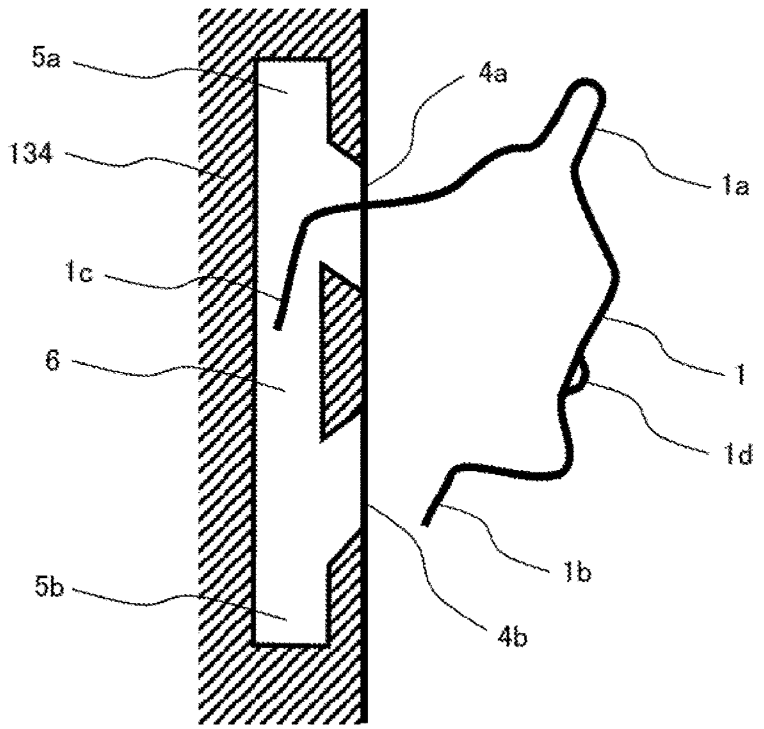
FIG. 15 is a cross sectional view illustrating a state in which a leaf spring end portion starts to be inserted into an upper opening portion of the upper end plug of the fuel rod according to the first embodiment of the fuel assembly according to the present invention in the boiling water reactor.
Figure 16:
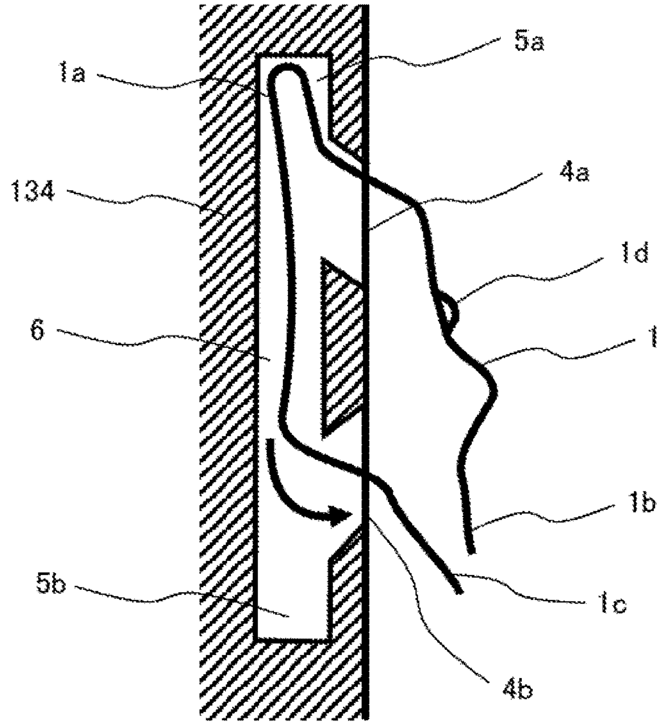
FIG. 16 is a cross sectional view illustrating a state in which a leaf spring intermediate portion of the leaf spring is stored in a leaf spring intermediate portion storage section in the upper end plug from the state illustrated in FIG. 15.

FIG. 15 illustrates a state in which the leaf spring end portion 1*c* starts to be inserted into the upper opening portion 4*a* of the upper end plug 134 of the fuel rod 121. FIG. 16 illustrates a state in which the leaf spring end portion 1*c* inserted from the upper opening portion 4*a* of the upper end portion 134 of the fuel rod 121 is extracted from the inside of the upper end portion 134 through the lower opening portion 4*b*.

As illustrated in FIG. 16, the leaf spring intermediate portion 1*a* of the leaf spring 1 is stored in the leaf spring intermediate portion storage section 5*a* within the upper end plug 134.

Figure 17:
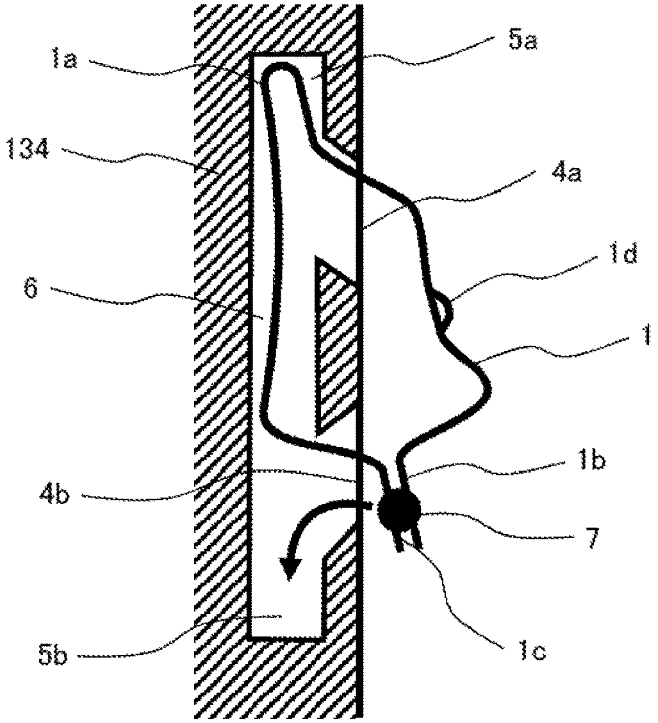
FIG. 17 is a cross sectional view illustrating a state in which both end portions of the leaf spring are welded to each other in the state illustrated in FIG. 16.
Figure 18:
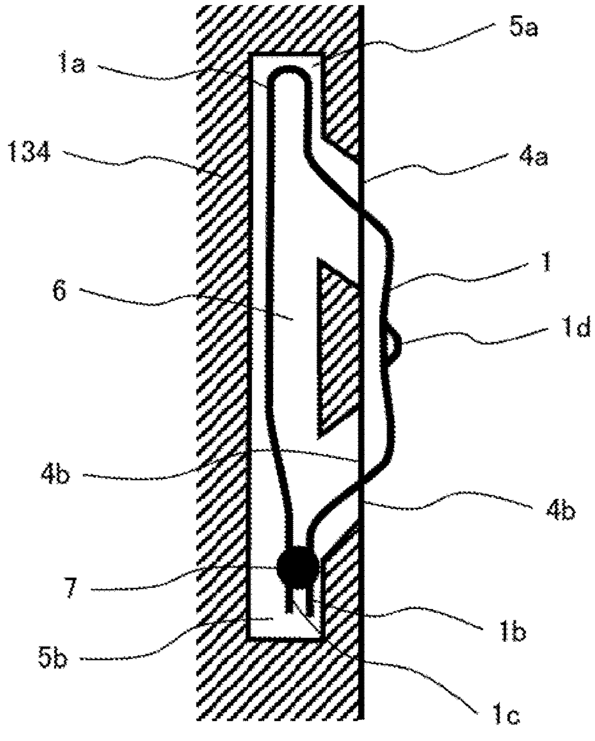
FIG. 18 is a cross sectional view illustrating a state in which both end portions of the leaf spring that are welded to each other via a welding portion are stored in a leaf spring end portion storage section in the upper end plug from the state illustrated in FIG. 17.

FIG. 17 illustrates a state in which both leaf spring end portions 1*b* and 1*c* of the leaf spring 1 are welded to each other via a welding portion 7. FIG. 18 illustrates a state in which the welding portion via which both leaf spring end portions 1*b* and 1*c* of the leaf spring 1 are welded to each other is stored in the leaf spring end portion storage section within the upper end plug 134.

When the upper end plug 134 is inserted in the insertion hole 138 of the upper tie plate 124 in the state illustrated in FIG. 18, the protruding portion 1*d* of the leaf spring 1 is pressed toward the upper end plug 134 side due to the contact of the protruding portion 1*d* of the leaf spring 1 with the inner wall surface of the insertion hole 138 of the upper tie plate 124. In coordination with the movement of the protruding portion 1*d*, the leaf spring intermediate portion 1*a* and the leaf spring end portion 1*b* move upward and downward in the leaf spring intermediate portion storage section 5*a* and the leaf spring end portion storage section 5*b*, respectively. Therefore, even when the cooling water flows during the operation of the reactor, the leaf spring 1 is not removed from the upper end plug 134 and does not become a loose part. In addition, even when the welding portion 7 where both leaf spring end portions 1*b* and 1*c* of the leaf spring 1 are welded to each other is damaged, the leaf spring end portions 1*b* and 1*c* of the leaf spring 1 are present in the leaf spring end portion storage section 5*b*, and thus the leaf spring 1 is not removed from the upper end plug 134.

Although the present embodiment describes the procedure for attaching the leaf spring 1 to the upper end plug 134, a procedure for attaching the leaf spring 11 to the lower end plug 135 is the same as or similar to the procedure for attaching the leaf spring 1 to the upper end plug 134. In addition, FIGS. 13, 14, 15, 16, 17, and 18 are described to facilitate understanding of the procedure for attaching the leaf spring 1 to the upper end plug 134, and the procedure is not limited to the present embodiment as long as the leaf spring 1 is a closed-loop spring and the has a structure in which a part of the leaf spring 1 is disposed in the upper end plate 134.

According to the present embodiment, it is possible to provide the fuel assembly 120 in which each of the upper and lower end plugs 134 and 135 of the fuel rod 121 has a support structure for supporting in the lateral direction that is effective to suppress a vibration of the fuel rod 121 by the support protrusions 2*a*, 2*b*, 3*a*, 3*b*, 12*a*, 12*b*, 13*a*, and 13*b* and the closed-loop leaf springs 1 and 11 that can reduce a possibility that each of the leaf springs 1 and 11 become a loose part, without significantly changing the structure of a conventional fuel assembly 120.

In addition, due to the above-described measures, a spacer as a countermeasure against a vibration of the fuel rod 121 is not required, and an effect of suppressing an increase in pressure loss can be expected.

Second Embodiment

A second embodiment of the fuel assembly 120 according to the present invention is described with reference to FIGS. 19 and 20.

Figure 19:
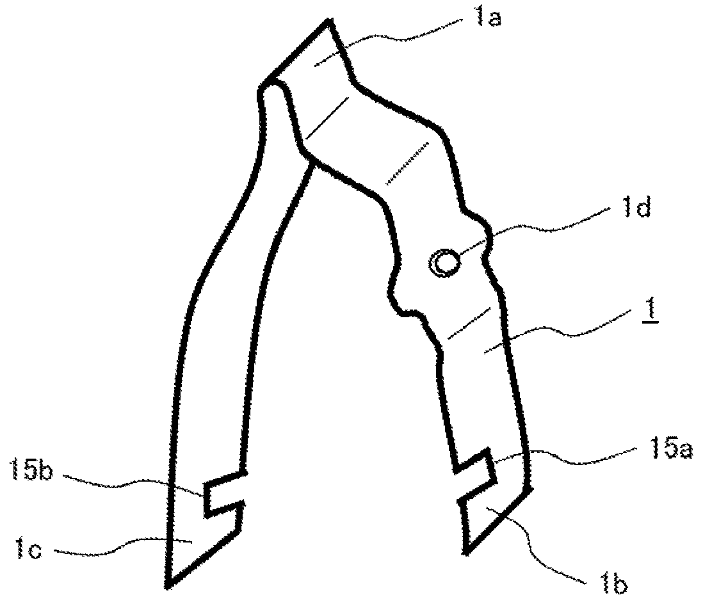
FIG. 19 is a perspective view illustrating a leaf spring constituting a part of a support structure portion provided for supporting in a lateral direction and used for an upper or lower end plug of a fuel rod according to a second embodiment of the fuel assembly according to the present invention in the boiling water reactor.
Figure 20:
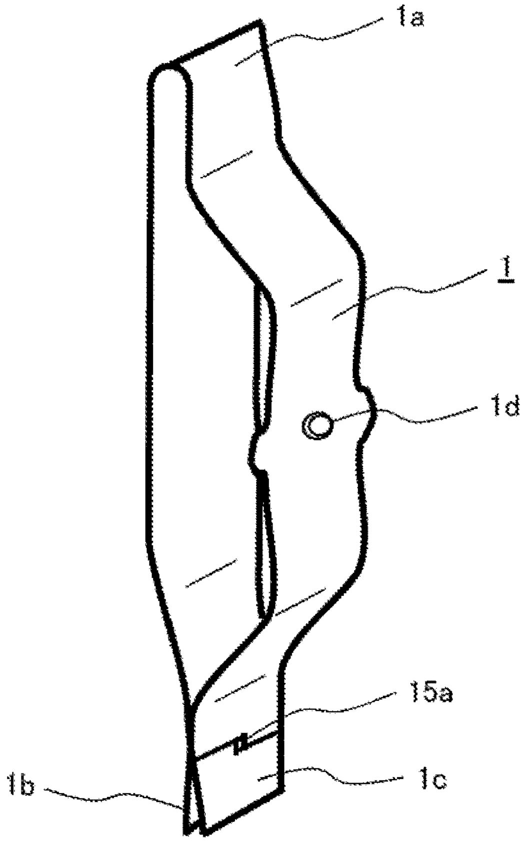
FIG. 20 is a perspective view illustrating a state in which cut portions disposed at both end portions of the leaf spring illustrated in FIG. 19 are fitted to each other.

FIGS. 19 and 20 illustrate a closed-loop leaf spring 1 according to the second embodiment of the fuel assembly 120 according to the present invention, and constituent components that are features in the second embodiment are cut portions **15*a* and 15*b* disposed at leaf spring end portions 1*b* and 1*c* of the leaf spring 1**.

FIG. 19 illustrates a state before the leaf spring 1 is closed and looped. The leaf spring 1 is processed to be folded in half with respect to a leaf spring intermediate portion **1*a* before the leaf spring 1 is attached to an upper end plug 134, similarly to the first embodiment described with reference to FIG. 13**.

In addition, in the first embodiment described with reference to FIG. 17, both leaf spring end portions **1*a* and 1*b* of the leaf spring 1 are welded to each other via the welding portion 7. On the other hand, in the second embodiment to be described with reference to FIGS. 19 and 20, the leaf spring 1 is closed and looped by fitting the cut portion 15*a* disposed at the leaf spring end portion 1*b* of the leaf spring 1 to the cut portion 15*b* disposed at the leaf spring end portion 1*c* of the leaf spring 1 as illustrated in FIG. 20, and thus the leaf spring 1** does not become a loose part.

In addition, it is not necessary to perform an operation of disposing a welding portion to weld both leaf spring end portions **1*b* and 1*b* of the leaf spring 21 to each other, although the operation of disposing the welding portion is performed in the first embodiment described with reference to FIG. 17**.

It is needless to say that the above-described configuration according to the second embodiment can be used for a lower end plug 135 in a similar manner to the upper end plug 134.

Even in the configuration according to the present embodiment, the same effects as those described in the first embodiment can be obtained.

Third Embodiment

A third embodiment of the fuel assembly 120 according to the present invention is described with reference to FIGS. 21 and 22.

Figure 21:
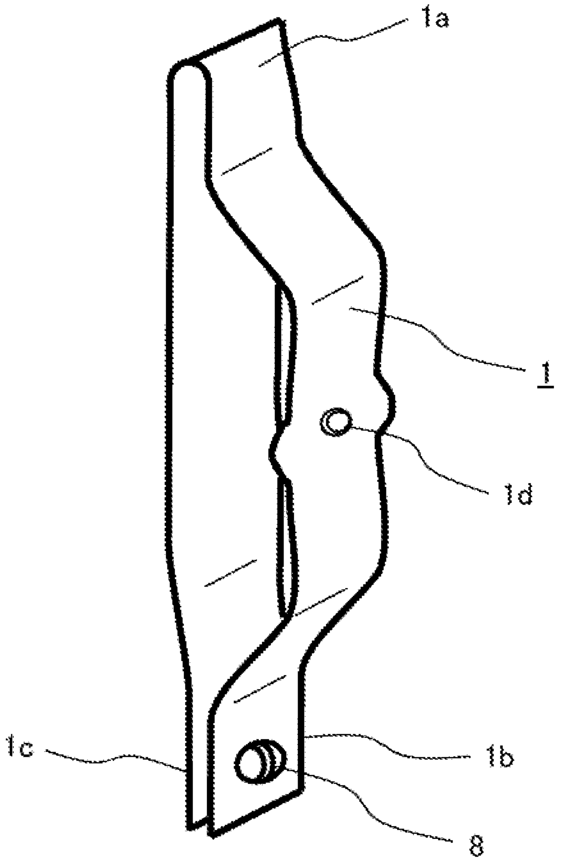
FIG. 21 is a perspective view illustrating a leaf spring constituting a part of a support structure portion provided for supporting in a lateral direction and used for an upper or lower end plug of a fuel rod according to a third embodiment of the fuel assembly according to the present invention in the boiling water reactor.
Figure 22:
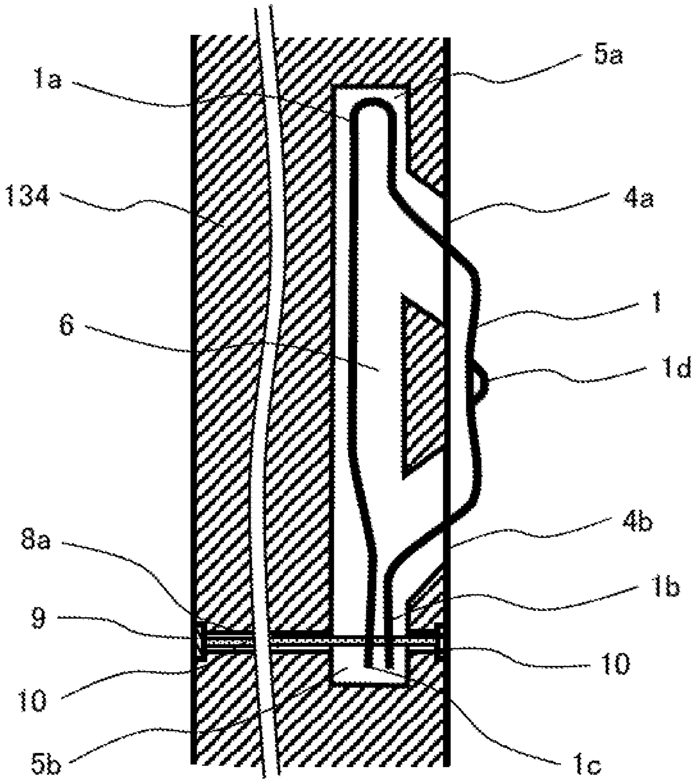
FIG. 22 is a diagram corresponding to FIG. 18 and illustrating a state in which the leaf spring illustrated in FIG. 21 is disposed at the upper end plug of the fuel rod.

FIGS. 21 and 22 illustrate a closed-loop leaf spring 1 according to the third embodiment of the fuel assembly 120 according to the present invention. Constituent components that are features in the third embodiment are opening portions 8 formed in the vicinity of both leaf spring end portions **1*b* and 1*c* of the leaf spring 1, a fastener 9 for preventing the positions of the openings 8 from shifting up and down, a fastener insertion hole 8*a* for inserting the fastener 9 through an upper end plug 134, and an insertion hole stopper for preventing the fastener 9 from slipping out of the fastener insertion hole 8*a***.

FIG. 21 illustrates a state before the leaf spring 1 is closed and looped. The leaf spring 1 is processed to be folded in half with respect to a leaf spring intermediate portion **1*a* before being attached to the upper end portion 134, similarly to the first embodiment described with reference to FIG. 13**.

In addition, in the first embodiment described with reference to FIG. 16, the leaf spring end portion **1*c* of the leaf spring 1 is extracted from the inside of the upper end plug 134 through a lower opening portion 4*b* after the leaf spring 1 is inserted through an opening portion communication section 6 in the upper end plug 134. On the other hand, in the third embodiment to be described with reference to FIGS. 21 and 22, the leaf spring end portion 1*c* of the leaf spring 1 is not extracted from the inside of the upper end plug 134 and is stored in a leaf spring end portion storage section 5*b***.

The fastener 9 is inserted in the opening portions 8 formed in the leaf spring end portions **1*b* and 1*c* of the leaf spring 1 that are disposed in the leaf spring end portion storage section 5*b*, and the faster insertion hole 8*a* in the upper end plug 134 so that the positions of the two leaf spring end portions 1*b* and 1*c* of the leaf spring 1** are not shifted.

Lastly, both ends of the fastener insertion hole **8*a* are closed with the insertion hole stopper 10 so that the leaf spring end portions 1*b* and 1*c* of the leaf spring 1 in the leaf spring end portion storage section 5*b* located on the lower side in the upper end plug 134 are not slipped out of the upper end plug 134**.

According to the configuration described in the third embodiment, the leaf spring 1 can be closed and looped without welding both leaf spring end portions **1*b* and 1*c* of the leaf spring 1 to each other and the leaf spring 1** does not become a loose part.

In addition, it is not necessary to perform an operation of disposing a welding portion 7 to weld the leaf spring end portions **1*b* and 1*c* of the leaf spring 1 to each other, although the operation of disposing the welding portion is performed in the first embodiment described with reference to FIG. 17**.

It is needless to say that the configuration according to the third embodiment can be used for a lower end plug 135 in a similar manner to the upper end plug 134.

Even in the configuration according to the present embodiment, the same effects as those described in the first embodiment can be obtained.

Fourth Embodiment

A fourth embodiment of the fuel assembly 120 according to the present invention is described with reference to FIGS. 23, 24, 25, 26, and 27.

Figure 23:
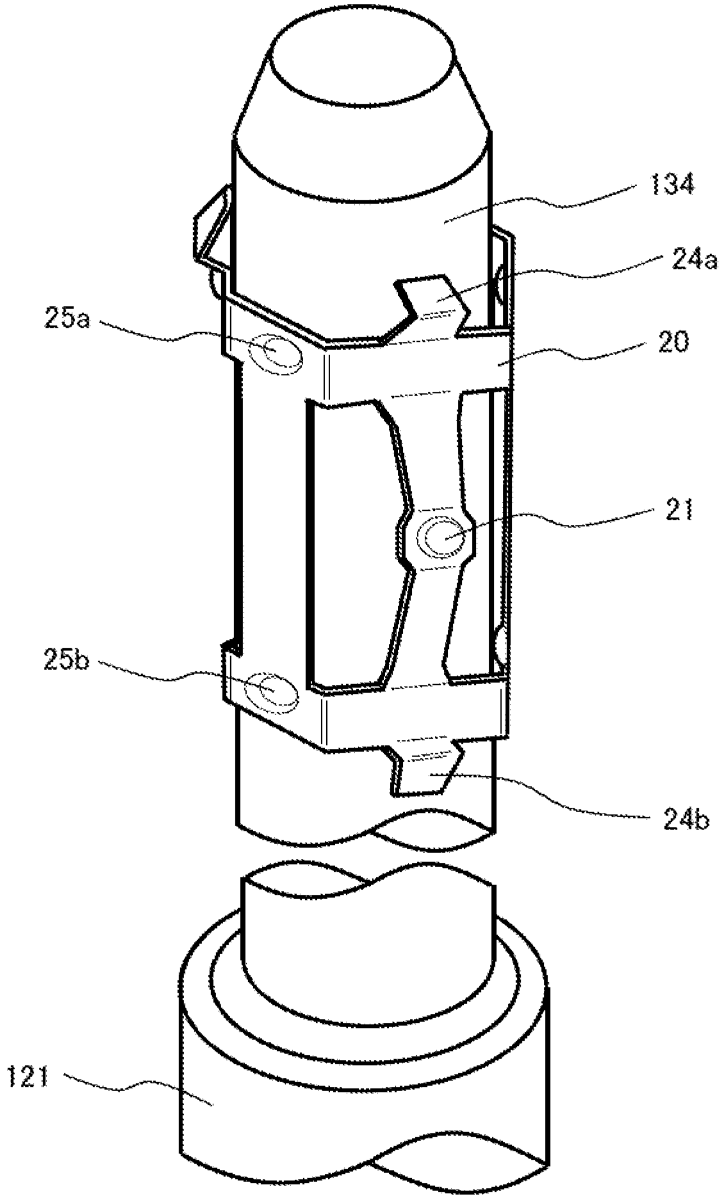
FIG. 23 is a perspective view illustrating a support structure portion provided for supporting in a lateral direction at an upper end plug of a fuel rod according to a fourth embodiment of the fuel assembly according to the present invention in the boiling water reactor.
Figure 24:
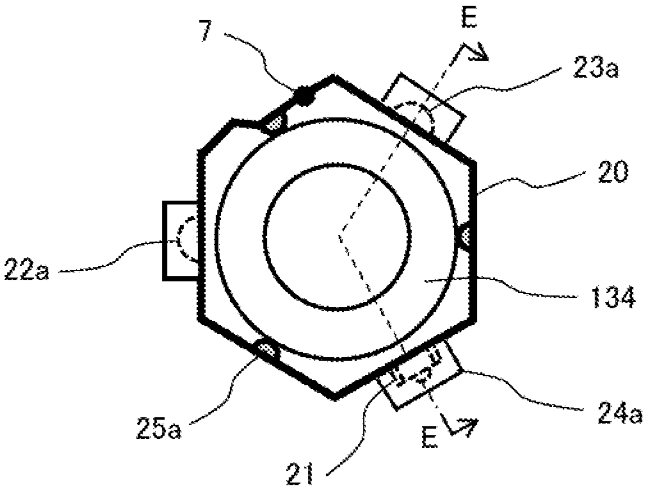
FIG. 24 is a plan view of the support structure portion illustrated in FIG. 23.
Figure 25:
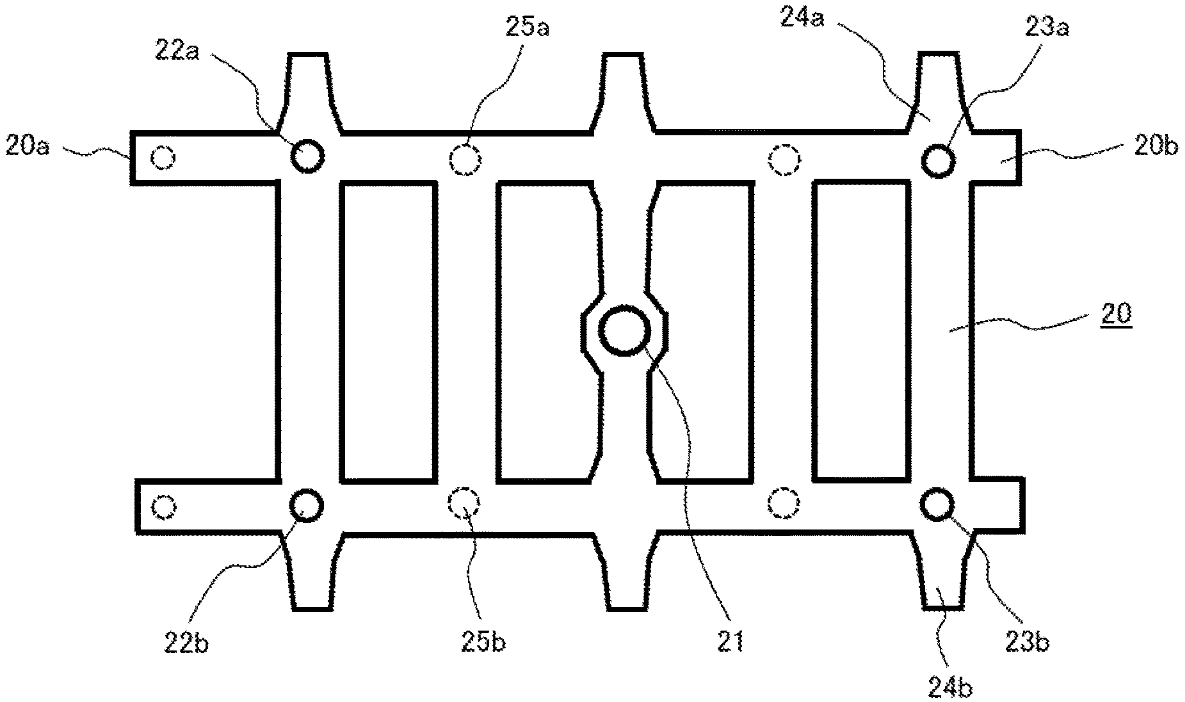
FIG. 25 is a development view of a hexagonal cylindrical plate disposed around the upper end plug of the fuel rod according to the fourth embodiment of the fuel assembly according to the present invention in the boiling water reactor.
Figure 26:
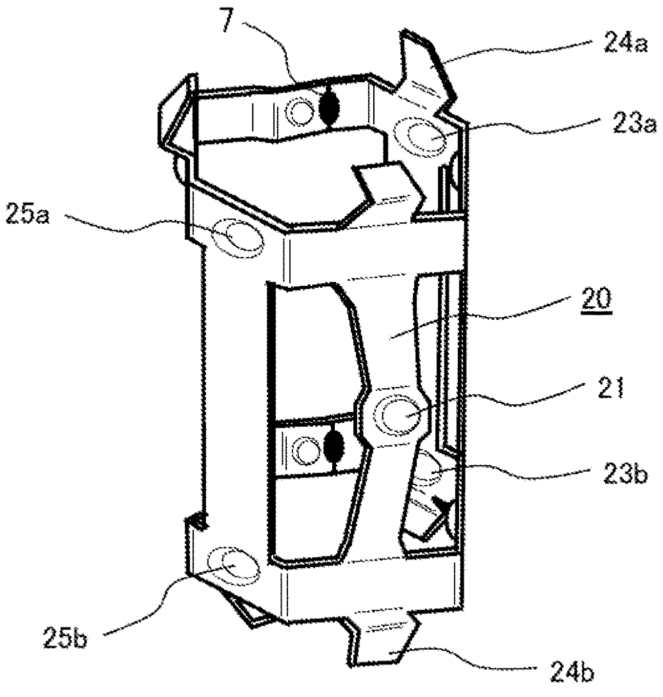
FIG. 26 is a perspective view illustrating the hexagonal cylindrical plate disposed around the upper end plug of the fuel rod according to the fourth embodiment of the fuel assembly according to the present invention in the boiling water reactor.
Figure 27:
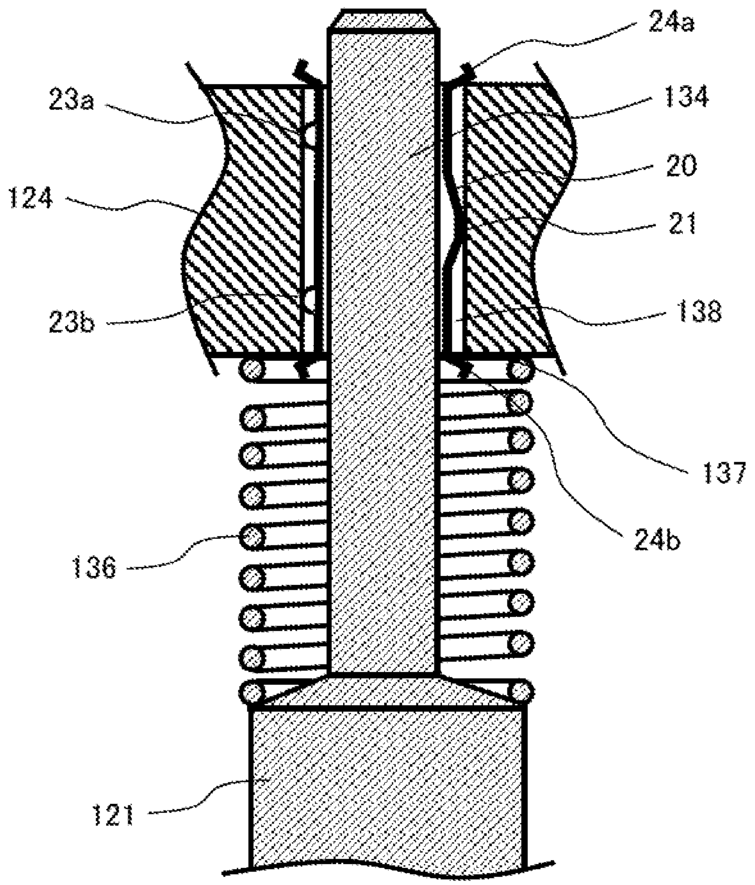
FIG. 27 is a cross sectional view taken along line E-E illustrated in FIG. 24.

FIG. 23 is a perspective view of a hexagonal cylindrical plate 20 disposed around an upper end plug 134 of a fuel rod 121. FIG. 24 is a plan view of the hexagonal cylindrical plate 20 disposed around the upper end plug 134 of the fuel rod 121. FIG. 25 is a development view of the hexagonal cylindrical plate 20 disposed around the upper end plug 134 of the fuel rod 121. FIG. 26 is a perspective view of the hexagonal cylindrical plate 20 disposed around the upper end plug 134 of the fuel rod 121. FIG. 27 is a partial detailed cross sectional view (cross sectional view taken along line E-E illustrated in FIG. 24) illustrating a state in which the upper end plug 134 with the hexagonal cylindrical plate 20 disposed therearound is embedded in the fuel assembly 120.

A constituent component that is a feature in the fourth embodiment to be described with reference to FIGS. 23, 24, 25, 26, and 27 is the hexagonal cylindrical plate 20 disposed around the upper end plug 134 of the fuel rod 121 and having a plurality of support protrusions **22*a*, 22*b*, 23*a*, and 23*b* and a protruding leaf spring 21. The hexagonal cylindrical plate 20** is specifically described below.

As illustrated in FIGS. 23 and 24, the hexagonal cylindrical plate 20 is disposed around the upper end plug 134 of the fuel rod 121. As illustrated in FIG. 24, the hexagonal cylindrical plate 20 is provided with the support protrusions **22*a* and 23*a* arranged at an angular interval of 120 degrees in two directions and the protruding leaf spring 21 arranged in one direction on the outer surface of the hexagonal cylindrical plate 20. The arrangement of the support protrusions 22***a* and 23*a* and the leaf spring 21 in this configuration is the same as the arrangement of the support protrusions 2*a* and 3*a* and the leaf spring 1 for the upper end plug 134 illustrated in FIG. 7C.

The upper side of the development view of the hexagonal cylindrical plate 20 illustrated in FIG. 25 indicates above in a disposing height direction, while the lower side of the development view of the hexagonal cylindrical plate 20 illustrated in FIG. 25 indicates below in the disposing height direction.

As illustrated in FIG. 25, the support protrusions 22*a* and 22*b* and the support protrusions 23*a* and 23*b* are disposed at two positions in the vertical direction, and the positions are located above and below the position of the protruding leaf spring 21 in the disposing height direction.

The protruding leaf spring 21, the support protrusions 22*a* and 22*b*, and the support protrusions 23*a* and 23*b* protrude toward the outer periphery side (outer side) instead of protruding toward the upper end plug 134 side (inner side) when the protruding leaf spring 21, the support protrusions 22*a* and 22*b*, and the support protrusions 23*a* and 23*b* are disposed around the upper end plug 134.

Meanwhile, to form an integrated structure of the upper end plug 134 and the hexagonal cylindrical plate 20, upper end plug holding portions 25*a* and 25*b* are disposed on the upper end plug 134 side (inner side). The upper end plug holding portions 25*a* and 25*b* are arranged at angular intervals of 120 degrees in three directions on an inner surface of the hexagonal cylindrical plate 20, as illustrated in FIG. 24.

The hexagonal cylindrical plate 20 can be easily formed, and the support protrusions 22*a*, 22*b*, 23*a*, and 23*b*, and the protruding leaf spring 21 can be easily molded by press working.

In addition, a member other than members necessary for the support protrusions 22*a*, 22*b*, 23*a*, and 23*b* and the protruding leaf spring 21 is not provided and thus it is possible to reduce the amount of materials required for the hexagonal cylindrical plate 20.

In addition, FIG. 26 illustrates a state in which the molded cylindrical plate 20 illustrated in FIG. 25 is bent to have a hexagonal shape as viewed from the upper surface.

The hexagonal cylindrical plate 20 is closed and looped by welding parts of the end portions 20*a* and 20*b* of the cylindrical plate 20 illustrated in FIG. 25 to each other via a welding portion 7 as illustrated in FIG. 26 or forming cut portions in the end portions 20*a* and 20*b* (see FIG. 19) and fitting the cut portions of the end portions to each other.

FIG. 27 is a partial detailed cross sectional view illustrating a state in which the upper end plug 134 with the hexagonal cylindrical plate 20 disposed around the upper end plug 134 of the fuel rod 121 is inserted in the insertion hole 138 of the upper tie plate 124.

As illustrated in FIG. 27, the support protrusions 23*a* and 23*b* and the protruding spring 21 disposed on the hexagonal cylindrical plate 20 are in point contact with the inner wall surface of the insertion hole 138 of the upper tie plate 124 (although not illustrated, the support protrusions 22*a* and 22*b* are in point contact with the inner wall surface of the insertion hole 138 of the upper tie plate 124 in a similar manner to the support protrusions 23*a* and 23*b*).

In the configuration according to the present embodiment, even when cooling water flows during the operation of the reactor, a vibration of the fuel rod 121 in the lateral direction can be suppressed by supporting the hexagonal cylindrical plate 20 by the support protrusions 22*a*, 22*b*, 23*a*, and 23*b* and the protruding leaf spring 21 disposed around the hexagonal cylindrical plate 20 forming an integrated structure with the upper end plug 134 of the fuel rod 121.

In addition, as illustrated in FIG. 25, bent portions 24*a* and 24*b* for preventing the cylindrical plate from slipping are disposed at three positions on each of the upper and lower portions of the hexagonal cylindrical plate 20 illustrated in FIG. 27 in the vertical direction. Since the bent portions 24*a* and 24*b* are hooked on the upper and lower surfaces of the upper tie plate 124, respectively, the hexagonal cylindrical plate 20 can be fixed to the insertion hole 138 of the upper end plug 134 without being welded.

Since the hexagonal cylindrical plate 20 is disposed around and fixed to the upper end plug 134, the hexagonal cylindrical plate 20 can be closed and looped without processing the upper end plug 134 and is not removed from the upper end plug 134 and does not become a loose part.

Since the fuel rod 121 is supported by the expansion spring 136 as a measure against thermal expansion and vibration of the fuel rod 121 in the vertical direction, there is no problem with the fuel rod 121. In addition, the hexagonal cylindrical plate 20 according to the present embodiment is bent to have a hexagonal shape as viewed from the upper surface, but there is no problem even when the cylindrical plate 20 has a shape other than the hexagonal shape. When the cylindrical plate has a polygonal shape with a smaller number of sides than the hexagonal shape, it is difficult to form an integrated structure of the cylindrical plate and the upper end plug 134, it is desirable that the cylindrical plate have a polygonal shape with a large number of sides as much as possible.

It is needless to say that the above-described configuration according to the fourth embodiment can be used for a lower end plug 135 in a similar manner to the upper end plug 134.

Even in the configuration according to the present embodiment, the same effects as those described in the first embodiment can be obtained.

Fifth Embodiment

Next, a fifth embodiment of the fuel assembly 120 according to the present invention is described with reference to FIGS. 28, 29, 30, and 31.

Figure 28:
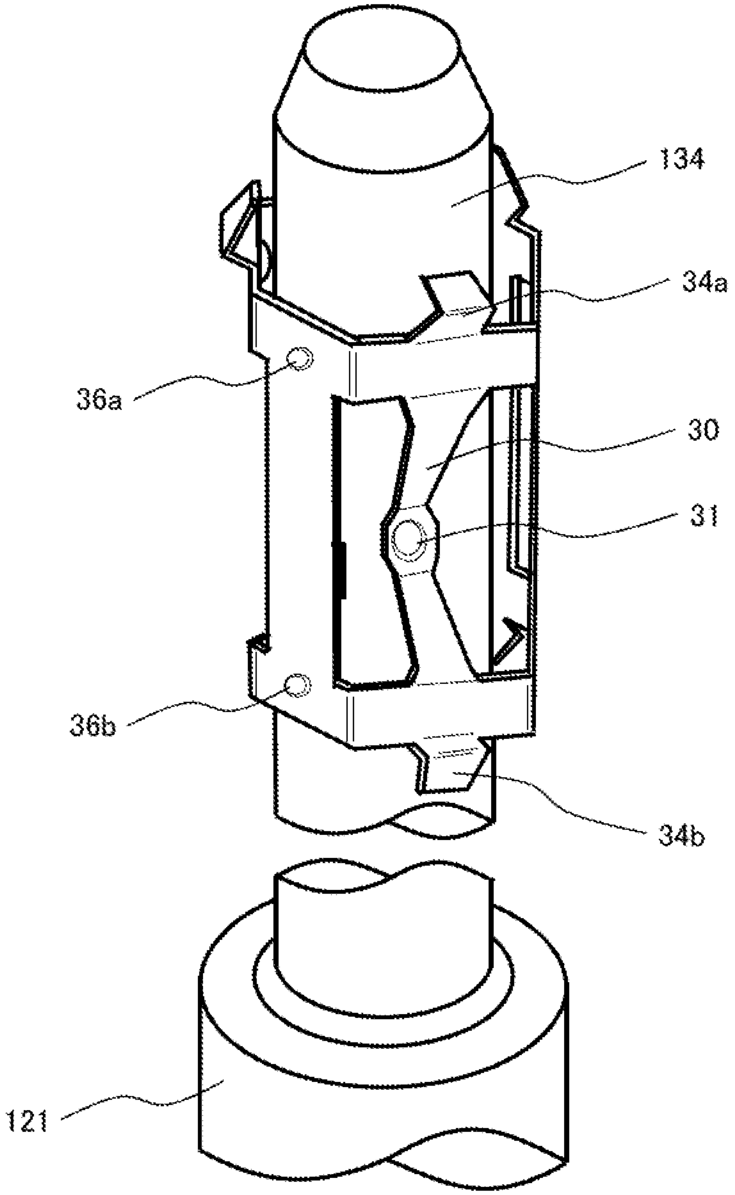
FIG. 28 is a perspective view illustrating a support structure portion provided for supporting in a lateral direction at an upper end plug of a fuel rod according to a fifth embodiment of the fuel assembly according to the present invention in the boiling water reactor.
Figure 29:
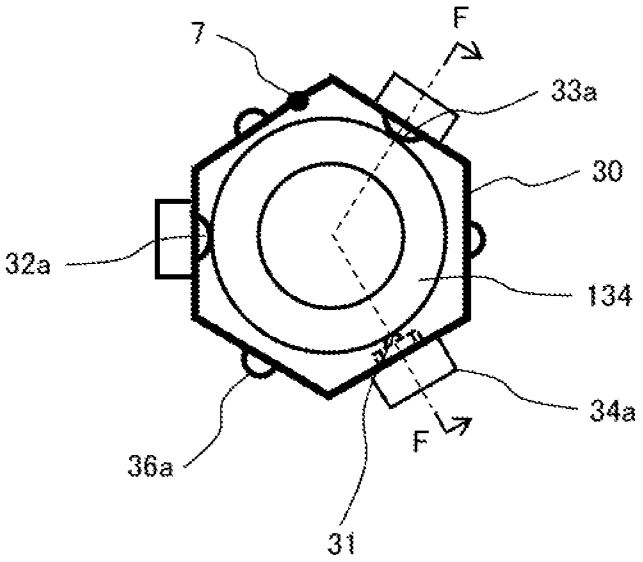
FIG. 29 is a plan view of the support structure portion illustrated in FIG. 28.
Figure 30:
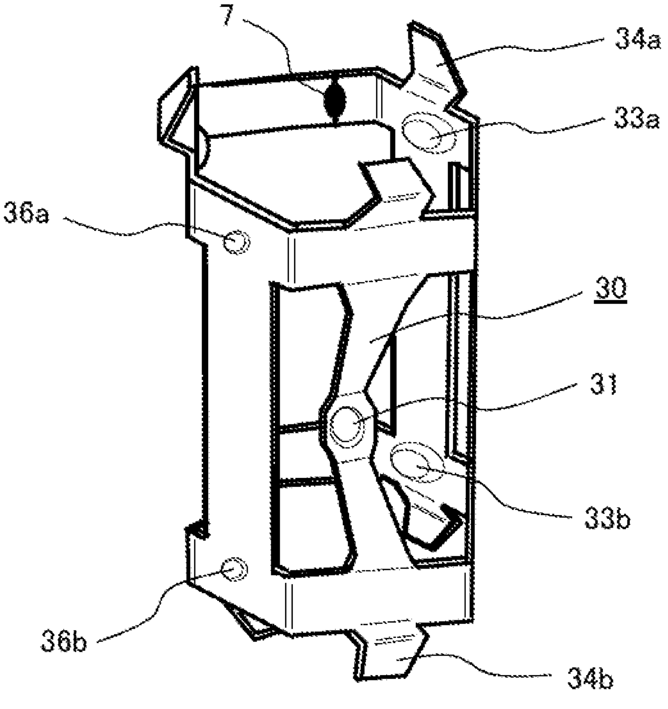
FIG. 30 is a perspective view illustrating a hexagonal cylindrical plate disposed around an upper end plug of a fuel rod according to a fifth embodiment of the fuel assembly according to the present invention in the boiling water reactor.
Figure 31:
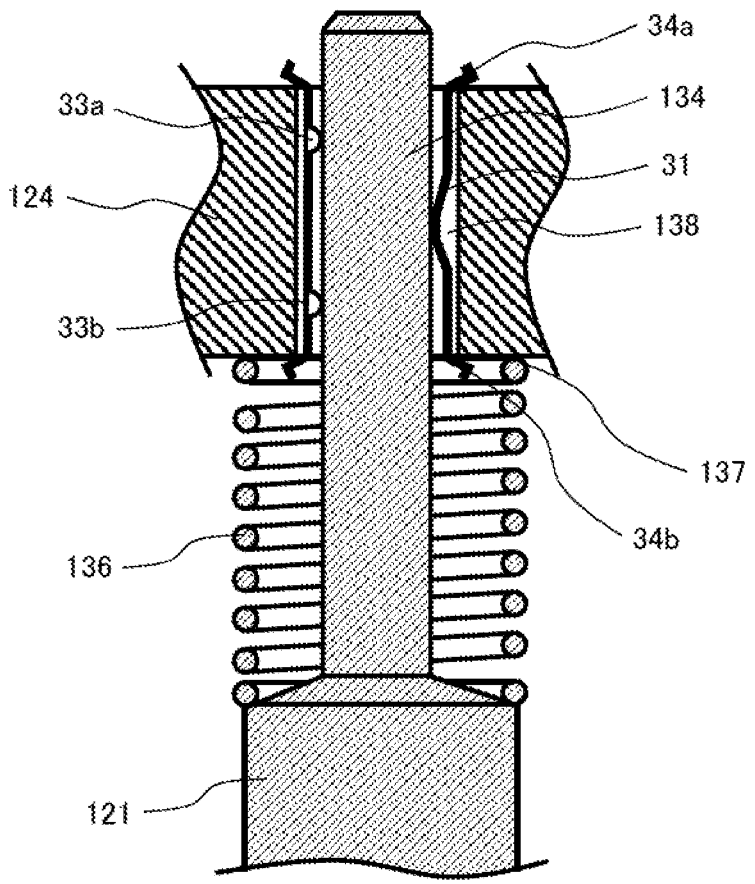
FIG. 31 is a cross sectional view taken along line F-F illustrated in FIG. 29.

FIG. 28 is a perspective view of a hexagonal cylindrical plate 30 disposed around an upper end plug 134 of a fuel rod 121. FIG. 29 is a plan view of the hexagonal cylindrical plate 30 disposed around the upper end plug 134 of the fuel rod 121. FIG. 30 is a perspective view of the hexagonal cylindrical plate 30 disposed around the upper end plug 134 of the fuel rod 121. FIG. 31 is a partial detailed cross sectional view (cross sectional view taken along line F-F illustrated in FIG. 29) of a state in which the upper end plug 134 provided with the hexagonal cylindrical plate 30 is embedded in the fuel assembly 120.

A constituent component that is a feature in the fifth embodiment described with reference to FIGS. 28, 29, 30, and 31 is the hexagonal cylindrical plate 30 having a plurality of support protrusions 32*a*, 32*b*, 33*a*, and 33*b* and a protruding leaf spring 31 disposed around the upper end plug 134 of the fuel rod 121, and this configuration is substantially the same as the configuration described in the fourth embodiment. The difference from the fourth embodiment is that the upper end plug 134 is supported by the support protrusions 32*a*, 32*b*, 33*a*, and 33*b* and the protruding leaf spring 31. This will be specifically described below.

As illustrated in FIGS. 28 and 29, the hexagonal cylindrical plate 30 is disposed around the upper end plug 134 of the fuel rod 121. As illustrated in FIG. 28, the hexagonal cylindrical plate 30 includes the support protrusions 32*a* and 32*b* arranged at an angular interval of 120 degrees in two directions and the protruding leaf spring 31 arranged in one direction on the inner surface of the hexagonal cylindrical plate 30. The arrangement of the support protrusions 32*a* and 32*b* and the protruding leaf spring 31 in this configuration is the same as the arrangement of the support protrusions 2*a* and 2*b* and the leaf spring 1 for the upper end plug 134 illustrated in FIG. 7C.

As illustrated in FIG. 29, in the present embodiment, when the protruding leaf spring 31 and the support protrusions 32*a*, 32*b*, 33*a*, and 33*b* are disposed around the upper end plug 134, the protruding leaf spring 31 and the support protrusions 32*a*, 32*b*, 33*a*, and 33*b* protrude toward the upper end plug 134 side (inner side), instead of protruding toward the outer periphery side (outer side).

On the other hand, to form an integrated structure of an upper tie plate 124 and the hexagonal cylindrical plate 30, holding portions 36*a* and 36*b* are disposed so as to protrude toward the upper tie plate 124 side (outer side). The holding portions 36*a* and 36*b* are arranged at angular intervals of 120 degrees in three directions on the inner surface of the hexagonal cylindrical plate 30 as illustrated in FIG. 30.

The hexagonal cylindrical plate 30 can be easily formed, and the support protrusions 32*a*, 32*b*, 33*a*, and 33*b*, and the protruding leaf spring 31 can be easily molded by press working.

In addition, a member other than members necessary for the support protrusions 32*a*, 32*b*, 33*a*, and 33*b* and the protruding leaf spring 31 is not provided and thus it is possible to reduce the amount of materials required for the hexagonal cylindrical plate 30.

In addition, similarly to the fourth embodiment, as illustrated in FIGS. 29 and 30, the hexagonal cylindrical plate 30 is closed and looped by welding parts of the end portions of the hexagonal cylindrical plate 30 to each other via a welding portion 7, or forming cut portions in the end portions of the hexagonal cylindrical plate 30 and fitting the cut portions of the end portions to each other.

FIG. 31 is a partial detailed cross sectional view illustrating a state in which the upper end plug 134 with the hexagonal cylindrical plate 30 disposed around the upper end plug 134 of the fuel rod 121 is inserted in an insertion hole 138 of the upper tie plate 124.

As illustrated in FIG. 31, the support protrusions 33*a* and 33*b* and the protruding leaf spring 31 disposed on the hexagonal cylindrical plate 30 are in point contact with the inner wall surface of the insertion hole 138 of the upper tie plate 124 (although not illustrated, the support protrusions 32*a* and 32*b* are in point contact with the inner wall surface of the insertion hole 138 of the upper tie plate 124 in a similar manner to the support portions 33*a* and 33*b*).

In the configuration according to the present embodiment, even when cooling water flows during the operation of the reactor, it is possible to suppress a vibration of the fuel rod 121 in the lateral direction by supporting the upper end plug 134 of the fuel rod 121 by the support protrusions 32*a*, 32*b*, 33*a*, and 33*b* and the protruding leaf spring 31 disposed on the hexagonal cylindrical plate 30.

In addition, bent portions 34*a* and 34*b* for preventing the cylindrical plate from slipping are formed at three portions of each of the upper and lower portions of the hexagonal cylindrical plate 30 in the vertical direction, as illustrated in FIG. 31. By hooking the bent portions 34*a* and 34*b* for preventing the cylindrical plate from slipping on the upper and lower surfaces of the upper tie plate 124, respectively, the hexagonal cylindrical plate 30 can be fixed into the insertion hole 138 for the upper end plug 134 without being welded.

Therefore, the hexagonal cylindrical plate 30 can be closed and looped by wrapping the hexagonal cylindrical plate 30 around the upper end plug 134 and fixing the end portions of the hexagonal cylindrical plate 30 to each other without processing the upper end plug 134, and the hexagonal cylindrical plate 30 is not removed from the upper end plug 134 and does not become a loose part.

Similarly to FIG. 9, the fuel rod 121 is supported by the expansion 136 as a measure against thermal expansion and vibration of the fuel rod 121 in the vertical direction, and thus there is no problem with the fuel rod 121. In addition, the hexagonal cylindrical plate 30 according to the present embodiment is bent to have a hexagonal shape as viewed from the upper surface, but there is no problem even when the cylindrical plate 30 has a polygonal shape other than the hexagonal shape. However, when the cylindrical plate 30 has a polygonal shape with a small number of sides, it is difficult to form an integrated structure of the cylindrical plate and the upper end plug 134. Therefore, it is desirable that the cylindrical plate have a polygonal shape with a large number of sides as much as possible.

The upper end plug 134 in the configuration according to the fifth embodiment is mainly described above. However, the configuration according to the fifth embodiment can be used for a lower end plug 135 in a similar manner to the upper end plug 134.

Even in the configuration according to the present embodiment, the same effects as those obtained in the first embodiment can be obtained.

The present invention is not limited to the above-described embodiments and includes various modifications. For example, the embodiments are described above in detail to easily understand the present invention and are not limited to the embodiments having all the configurations described above. In addition, a part of a configuration according to a certain embodiment among the above-described embodiments can be replaced with a configuration according to another embodiment among the above-described embodiments. In addition, a configuration according to a certain embodiment among the above-described embodiments can be added to a configuration according to another embodiment among the above-described embodiments. In addition, for a part of the configuration according to each of the embodiments, addition, removal, and replacement of another configuration can be made.

REFERENCE SIGNS LIST

1, 11 . . . Leaf Spring, 1*a* . . . Leaf spring intermediate portion, 1*b*, 1*c* . . . Leaf spring end portion, 1*d*, 11*d* . . . Protruding portion of leaf spring, 1*e* . . . Short side of leaf spring, 2*a*, 2*b*, 3*a*, 3*b*, 12*a*, 12*b*, 13*a*, 13*b*, 22*a*, 22*b*, 23*a*, 23*b*, 32*a*, 32*b*, 33*a*, 33*b* . . . Support protrusions, 4*a* . . . Upper opening portion of upper end plug, 4*b* . . . Lower opening portion of upper end plug, 5*a* . . . Leaf spring intermediate portion storage section, 5*b* . . . Leaf spring end portion storage section, 6 . . . Opening portion communication section, 7 . . . Welding portion, 8 . . . Opening portion of leaf spring end portion, 8*a* . . . Fastener insertion hole, 9 . . . Fastener, 10 . . . Insertion hole stopper, 14*a* . . . Upper opening portion of lower end plug, 14*b* . . . Lower opening portion of lower end plug, 15*a*, 15*b* . . . Cut portion, 20, 30 . . . Hexagonal cylindrical plate, 20*a*, 20*b* . . . End portion of hexagonal cylindrical plate, 21, 31 . . . Protruding leaf spring, 24*a*, 24*b*, 34*a*, 34*b* . . . Bent portion for preventing cylindrical plate from slipping, 25*a*, 25*b* . . . Upper end plug holding portion, 36*a*, 36*b* . . . Holding portion, 100 . . . Boiling water reactor, 101 . . . Reactor pressure vessel, 102 . . . Reactor core shroud, 103 . . . Reactor core, 104 . . . Shroud head, 105 . . . Steam separator, 106 . . . Steam dryer, 108 . . . Reactor core support plate, 109 . . . Fuel support metal fixture, 110 . . . Control rod guiding pipe, 111 . . . Control rod drive mechanism, 113 . . . Internal pump, 114 . . . Downcomer, 115 . . . Main steam pipe, 116 . . . Water supply pipe, 117 . . . Impeller, 118 . . . Cooling water, 120 . . . Fuel assembly, 121 . . . Fuel rod, 122 . . . Spacer, 123 . . . Lower tie plate, 124 . . . Upper tie plate, 125 . . . Channel box, 127 . . . Upper opening portion, 128 . . . Control rod movement opening portion, 129 . . . Upper grid plate, 130 . . . Handle, 132 . . . Cross-shaped control rod, 133 . . . Channel spacer, 134 . . . Upper end plug, 135 . . . Lower end plug, 135*a* . . . Tapered portion of lower end plug, 136 . . . Expansion spring, 137 . . . Lower surface of upper tie plate, 138 . . . Insertion hole for upper end plug, 139 . . . Insertion hole for lower end plug, 140 . . . Space for movement of cross-shaped control rod

What is claimed is:

1. A fuel assembly comprising:

a fuel rod having an upper end plug disposed at an upper end portion of the fuel rod; and a tie plate that supports at least an upper portion of the upper end plug, wherein the upper end plug includes a plurality of support protrusions on a surface of the upper end plug, and a closed-loop spring having a portion that is inserted through upper and lower opening portions formed in the upper end plug and is stored in a single space formed in the upper end plug that communicates between the upper and lower opening portions, and a remaining portion protruding to the outside of the upper end plug, and the upper end plug is supported by the plurality of support protrusions and the closed-loop spring in a state in which the plurality of support protrusions and the closed-loop spring are in contact with an inner wall of an insertion hole formed in the tie plate.

2. The fuel assembly according to claim 1, wherein the support protrusions are arranged in two of three directions whose angular interval is 120 degrees and the spring is arranged in one of the three directions on a front surface of the upper end plug.

3. The fuel assembly according to claim 2, when the upper end plug is inserted in the insertion hole formed in the tie plate, each of the support protrusions has a semicircular shape and the spring includes a protruding portion having a protruding shape partially protruding at one location such that portions of the tie plate are in point contact with or nearly in point contact with the support protrusions and the spring.

4. The fuel assembly according to claim 3, wherein the spring is closed and looped such that an end portion of the part of the spring and an end portion of the remaining part of the spring are inserted through the upper and lower opening portions disposed in the upper end plug and are stored in the single space formed in the upper end plug, and the support protrusions, the closed-loop spring, and the inner wall of the insertion hole formed in the tie plate constitute a support structure configured to support the upper end plug in a lateral direction.

5. The fuel assembly according to claim 4, wherein the two opening portions are an upper opening portion formed in an upper portion of the upper end plug and a lower opening portion formed in a lower portion of the upper end plug, and the single space is an opening portion communication section causing the upper opening portion to communicate with the lower opening portion in the upper end plug.

6. The fuel assembly according to claim 5, wherein the spring is a leaf spring closed and looped by folding a plate material having a rectangular shape with a short side and a long side in half with respect to an intermediate portion of the plate material.

7. The fuel assembly according to claim 6, wherein the leaf spring is closed and looped by fixing the leaf spring by welding, to each other, both ends of the leaf spring on the short-side side or portions of the leaf spring that are present near the ends of the leaf spring, or fixing the leaf spring by forming cut portions in the portions present near the ends of the leaf spring and fitting the cut portions to each other, or fixing the leaf spring by using opening portions disposed near the portions present near the ends of the leaf spring on the short-side side, a fastener configured to prevent positions of the opening portions from shifting, a fastener insertion hole configured to insert the fastener through the upper end plug, an insertion hole stopper configured to prevent the fastener from slipping out of the fastener insertion hole.

8. The fuel assembly according to claim 7, wherein a leaf spring intermediate portion storage section capable of storing a leaf spring intermediate portion of the leaf spring folded in half is formed above the opening portion communication section, and a leaf spring end portion storage section capable of storing both end portions of the closed-loop leaf spring is formed below the opening portion communication section.

* * * * *